US010268662B2

(12) United States Patent
Hadley et al.

(10) Patent No.: US 10,268,662 B2
(45) Date of Patent: Apr. 23, 2019

(54) PANOPTIC VISUALIZATION OF A DOCUMENT ACCORDING TO THE STRUCTURE THEREOF

(75) Inventors: Brent L. Hadley, Kent, WA (US); Patrick J. Eames, Newcastle, WA (US); Stephen P. Miller, Bellevue, WA (US); Joseph F. Floyd, University Place, WA (US); Carrie A. LaPonza, Los Angeles, CA (US)

(73) Assignee: THE BOEING COMPANY, Chicago, IL (US)

( * ) Notice: Subject to any disclaimer, the term of this patent is extended or adjusted under 35 U.S.C. 154(b) by 287 days.

(21) Appl. No.: 13/608,601

(22) Filed: Sep. 10, 2012

(65) Prior Publication Data

US 2014/0075294 A1 Mar. 13, 2014

(51) Int. Cl.
*G06F 17/00* (2006.01)
*G06F 17/21* (2006.01)
*G06F 17/30* (2006.01)

(52) U.S. Cl.
CPC ...... *G06F 17/212* (2013.01); *G06F 17/30274* (2013.01)

(58) Field of Classification Search
CPC ......... G06F 17/30259; G06F 17/30247; G06F 17/30274; G06F 17/2247; G06F 9/4443; G06F 17/3028; G06F 17/30716
USPC .................................. 715/243, 202, 209, 203
See application file for complete search history.

(56) References Cited

U.S. PATENT DOCUMENTS

| 5,341,466 A | 8/1994 | Perlin et al. |
| RE36,145 E | 3/1999 | DeAguiar et al. |
| 6,189,019 B1 * | 2/2001 | Blumer ............ G06F 17/30873 707/999.102 |
| 6,301,592 B1 * | 10/2001 | Aoyama et al. .............. 715/229 |

(Continued)

FOREIGN PATENT DOCUMENTS

| EP | 1 176 520 A2 | 1/2002 |
| EP | 1 503 301 A2 | 2/2005 |

(Continued)

OTHER PUBLICATIONS

European Search Report dated Aug. 7, 2013 for European Application No. 13 160 361.5; 6 pages.

(Continued)

*Primary Examiner* — Laurie A Ries
(74) *Attorney, Agent, or Firm* — Womble Bond Dickinson (US) LLP

(57) ABSTRACT

A system is provided for panoptic visualization of a document having a structure defined according to a particular schema. The system is configured to generate a layout of pages of the document, panoptically arranged in a manner that reflects logical relationships between the pages according to the structure of the document, which may in turn reflect relationships between the subjects or their objects depicted by the content. These logical relationships may be established by links between pages, which may be identified by information provided in associated metadata for the pages. This type of arrangement may enable a user to see the content in a single view, and in an arrangement that facilitates a better understanding of the relationships between the content and their subjects or objects, which may be otherwise difficult to comprehend.

27 Claims, 18 Drawing Sheets

(56) References Cited

U.S. PATENT DOCUMENTS

| | | | |
|---|---|---|---|
| 6,366,933 B1* | 4/2002 | Ball | G06F 17/30899 707/E17.119 |
| 6,611,725 B1* | 8/2003 | Harrison et al. | 700/98 |
| 6,628,304 B2* | 9/2003 | Mitchell | G06F 3/0481 715/734 |
| 6,650,998 B1 | 11/2003 | Rutledge | |
| 6,684,087 B1 | 1/2004 | Yu et al. | |
| 6,704,024 B2 | 3/2004 | Robotham et al. | |
| 6,766,331 B2 | 7/2004 | Shema et al. | |
| 7,200,271 B2 | 4/2007 | Boose et al. | |
| 7,246,328 B2 | 7/2007 | Boose et al. | |
| 7,365,747 B2 | 4/2008 | Finlayson et al. | |
| 7,562,302 B1* | 7/2009 | Barrus | G06F 3/0481 715/730 |
| 7,680,324 B2* | 3/2010 | Boncyk et al. | 382/165 |
| 7,783,644 B1 | 8/2010 | Petrou et al. | |
| 7,802,204 B2 | 9/2010 | Merry et al. | |
| 7,870,224 B1 | 1/2011 | Maigatter | |
| 7,872,650 B2 | 1/2011 | Fay | |
| 7,921,452 B2 | 4/2011 | Ridlon et al. | |
| 8,051,031 B2 | 11/2011 | Sims, III et al. | |
| 8,131,779 B2* | 3/2012 | Jonker | G06F 17/30017 707/811 |
| 8,132,122 B2* | 3/2012 | Risch | G06F 17/30716 715/848 |
| 2002/0194190 A1* | 12/2002 | Shema | G06F 17/241 |
| 2003/0055871 A1 | 3/2003 | Roses | |
| 2003/0100964 A1 | 5/2003 | Kluge et al. | |
| 2004/0003097 A1 | 1/2004 | Willis et al. | |
| 2004/0028294 A1 | 2/2004 | Fukuda | |
| 2004/0081342 A1* | 4/2004 | Sato | G06T 5/50 382/128 |
| 2004/0093564 A1 | 5/2004 | Kumhyr et al. | |
| 2004/0223648 A1* | 11/2004 | Hoene | G06F 17/2211 382/218 |
| 2004/0267701 A1 | 12/2004 | Horvitz et al. | |
| 2006/0161863 A1 | 7/2006 | Gallo | |
| 2007/0094615 A1 | 4/2007 | Endo et al. | |
| 2007/0226605 A1 | 9/2007 | Thomas | |
| 2008/0074423 A1 | 3/2008 | Gan et al. | |
| 2008/0109757 A1* | 5/2008 | Stambaugh | G06F 3/0481 715/835 |
| 2008/0111813 A1 | 5/2008 | Gatzke et al. | |
| 2008/0247636 A1 | 10/2008 | Davis et al. | |
| 2008/0295036 A1* | 11/2008 | Ikeda | G06T 11/206 715/848 |
| 2009/0086014 A1 | 4/2009 | Lea et al. | |
| 2009/0086199 A1 | 4/2009 | Troy et al. | |
| 2009/0112820 A1 | 4/2009 | Kessel et al. | |
| 2009/0138139 A1 | 5/2009 | Tsai et al. | |
| 2009/0317020 A1* | 12/2009 | Gerhard et al. | 382/299 |
| 2010/0042361 A1 | 2/2010 | Hadley et al. | |
| 2010/0102980 A1 | 4/2010 | Troy et al. | |
| 2010/0223269 A1 | 9/2010 | Shuf et al. | |
| 2010/0229115 A1 | 9/2010 | Augustine et al. | |
| 2010/0281034 A1 | 11/2010 | Petrou et al. | |
| 2010/0306696 A1 | 12/2010 | Groth et al. | |
| 2011/0087463 A1 | 4/2011 | Nakhle et al. | |
| 2011/0087513 A1 | 4/2011 | Floyd et al. | |
| 2011/0149266 A1 | 6/2011 | Motzer et al. | |
| 2011/0235858 A1 | 9/2011 | Hanson et al. | |
| 2012/0188248 A1 | 7/2012 | Eames et al. | |
| 2012/0221625 A1 | 8/2012 | Troy et al. | |
| 2012/0324378 A1* | 12/2012 | Stambaugh | G06F 3/04817 715/764 |
| 2018/0293307 A1* | 10/2018 | Evanchik | G06F 3/0483 |

FOREIGN PATENT DOCUMENTS

| | | |
|---|---|---|
| EP | 1 860 573 A1 | 11/2007 |
| EP | 2 482 538 A1 | 8/2012 |
| EP | 2 642 414 A2 | 9/2013 |
| RU | 2351976 C2 | 4/2009 |
| RU | 2368943 C2 | 9/2009 |
| RU | 2398050 C2 | 4/2010 |
| RU | 2390822 C2 | 5/2010 |
| WO | 2009005949 A1 | 1/2009 |

OTHER PUBLICATIONS

European Search Report dated Sep. 2, 2013 for European Application No. 13 160 848.1; 6 pages.

Rao et al., "Rich Interaction in the Digital Library," Apr. 1995, Communications of the ACM, Association for Computing Machinery, Inc., United States, vol. 38, No. 4, pp. 29-39.

European Search Report dated Mar. 6, 2013 for European Application No. 12198374.6, 7 pages.

European Search Report dated Mar. 12, 2013 for European Application No. 12198679.8, 8 pages.

European Search Report dated Mar. 19, 2013 for European Application No. 12195735.1, 7 pages.

"Hard Rock Memorabilia," Copyright 2009, Hard Rock Cafe International, Inc., [retrieved on Apr. 18, 2012] Retrieved using Internet <URL: http://memorabilia.hardrock.com, 2 pages.

"Deep Zoom," Mar. 2008, Wikipedia, The Free Encyclopedia, [retrieved on Apr. 18, 2012] Retrieved using Internet <URL: http://en.wikipedia.org/wiki/DeepZoom; 4 pages.

"About Deep Zoom Composer," Microsoft, Copyright 2011 [retrieved on Nov. 23, 2011] Retrieved using Internet <URL: http://msdn.microsoft.com/en-us/library/dd409068(d=printer).aspx; 4 pages.

Airframe & Powerplant Mechanics General Handbook, US Department of Transportation Federal Aviation Administration, Chapter 2, pp. 35-52; Mar. 31, 1999.

EP Search Report dated May 15, 2012 for EP Appl. No. 12152591.9, 13 pgs.

"Futuristic software from Minority Report is real," published Jul. 23, 2012, [retrieved on Aug. 30, 2012] Retrieved using Internet <URL: http://www.foxnews.com/tech/2012/07/23/futuristic-software-from-minority-report-is-real/; 3 pages.

European Search Report dated Dec. 12, 2013 for European Application No. 13 184 084.5, 6 pages.

"Data differencing," 2012, Wikipedia, The Free Encyclopedia, [retrieved on Jul. 9, 2012] Retrieved using Internet <URL: http://en.wikipedia.org/w/index.php?title=Data_differencing&printable=yes, 3 pages.

International Search Report dated Jan. 18, 2013 for PCT/US2012/058937, 4 pages.

International Search Report dated Dec. 21, 2012 for PCT/US2012/054808, 4 pages.

Li et al., "Automated Generation of Interactive 3D Exploded View Diagrams," copyright Aug. 2008, ACM Transactions on Graphics, vol. 27, No. 3, 7 pages.

Quintana et al., "Will Model-based Definition replace engineering drawings throughout the product lifecycle? A global perspective from aerospace industry," copyright 2010, Computers in Industry, vol. 61, pp. 497-508.

Tatzgern et al., "Multi-Perspective Compact Explosion Diagrams," copyright Feb. 2011, Computers & Graphics, vol. 35, No. 1, pp. 135-147.

Hunter, "Theodolite, Documentation/Help/FAQ," Apr. 24, 2012, Hunter Research and Technology LLC [retrieved on Dec. 14, 2012] Retrieved using Internet <URL: http://hunter.pairsite.com/mobile/theodolite/help/, 6 pages.

Written Opinion dated Jan. 18, 2013 for PCT/US2012/058937, 9 pages.

Written Opinion dated Dec. 21, 2012 for PCT/US2012/054808, 6 pages.

European Search Report dated Feb. 10, 2014 for European Application No. 13 194 943.0, 6 pages.

European Search Report dated Apr. 4, 2014 for European Application No. 14 152 644.2, 8 pages.

European Search Report dated Apr. 4, 2014 for European Application No. 14 152 646.7, 9 pages.

Cohn, "Back to Flat—Producing 2D Output from 3D Models," Autodesk University 2009, Dec. 11, 2009, pp. 1-14.

(56) References Cited

OTHER PUBLICATIONS

Li et al., "Automated Generation of Interactive 3D Exploded View Diagrams," ACM Transactions on Graphics, vol. 27, No. 3, Aug. 1, 2008, 7 pages.
Petre et al., "3D Model-based Semantic Labeling of 2D Objects," 2011 International Conference on Digital Image Computing: Techniques and Applications (DICTA), IEEE, Dec. 6, 2011, pp. 152-157.
Tatzgern et al., "Multi-perspective Compact Explosion Diagrams," Computers & Graphics, vol. 35, No. 1, Feb. 1, 2011, pp. 135-147.
Chinese Office Action dated Jun. 1, 2016 in Chinese Patent Application No. 20130409306.8 filed Sep. 10, 2012.
Chinese Office Action dated Feb. 7, 2017 in Chinese Patent Application No. 20130409306.8 filed Sep. 10, 2012.
GCC Patent Office Examination Report dated Jul. 13. 2017 for Application No. GC 2013-25346.
Federal State Intellectual Property Office Action dated Sep. 1, 2017 for Application No. 2013141216108(062937).
European Search Report dated Nov. 24, 2017 in European Application No. 13183430.1.

\* cited by examiner

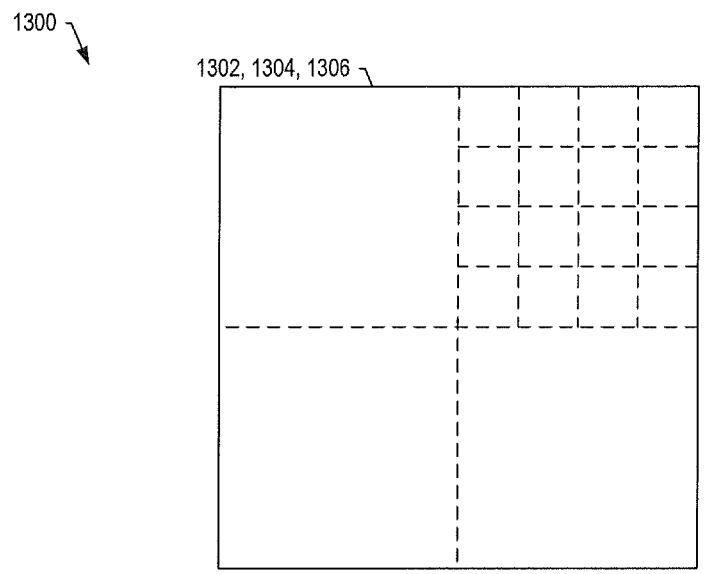
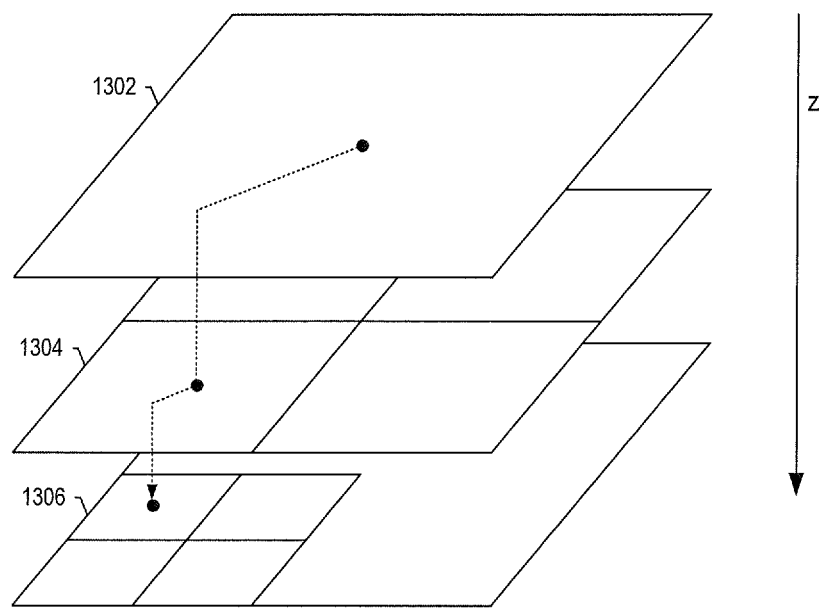
FIG. 13

PANOPTIC VISUALIZATION OF A DOCUMENT ACCORDING TO THE STRUCTURE THEREOF

CROSS-REFERENCE TO RELATED APPLICATION(S)

The present application is related to U.S. patent application Ser. No. 13/414,987, entitled: Panoptic Visualization Document Layout, U.S. patent application Ser. No. 13/414,964, entitled: Panoptic Visualization Document Navigation, and U.S. patent application Ser. No. 13/414,940, entitled: Panoptic Visualization Document Collection, all of which filed on Mar. 8, 2012; and which claim priority to respective ones of U.S. Provisional Patent Application No. 61/578,349, entitled: Panoptic Visualization Document Layout, U.S. Provisional Patent Application No. 61/578,357, entitled: Panoptic Visualization Document Navigation, and U.S. Provisional Patent Application No. 61/578,361, entitled: Panoptic Visualization Document Collection, all of which filed on Dec. 21, 2011. The present application is also related to U.S. patent application Ser. No. 13/072,217, entitled: Image Management and Presentation, filed on Mar. 25, 2011, which claims priority to U.S. Provisional Patent Application No. 61/436,585, entitled: Navigation to Aircraft Maintenance Information Using Tiled 2D Illustrations, filed on Jan. 26, 2011. The contents of all of the aforementioned are incorporated herein by reference in their entireties.

TECHNOLOGICAL FIELD

The present disclosure relates generally to panoptic visualization of documents and, in particular, to panoptic visualization of documents or their document components in a manner that reflects logical relationships between the documents/components according to the structure thereof.

BACKGROUND

Information printed about a topic is often printed on multiple pages because the information does not fit on a single page and/or is more effectively presented using multiple pages. The multiple pages may be in the same source or in multiple sources. For example, technical drawings of an aircraft may be printed such that different portions of the same diagram may be printed on different pages. Drawings of one assembly on the aircraft may be contained in one library or source, while drawings of another assembly may be contained in a second library or source.

Printed information may also be printed such that one document contains one level of detail about an object, while a second document contains a second level of detail about the same object. For example, a diagram of an aircraft may be printed such that the exterior of the aircraft is visible in the diagram. Another diagram of the same aircraft may be printed such that the exterior of the aircraft is obscured, but the interior of the aircraft is presented. Thus, a reader may use different diagrams to learn different information about the same object.

As another example, wiring diagrams of wiring systems are often printed across multiple pages because the graphical and textual information presented in the wiring diagram is too great to fit on a single page. Thus, a reader may change documents multiple times to learn information about an entire wiring system.

Documents such as engineering diagrams, technical drawings, wiring diagrams, and other suitable document types may be used in the maintenance of an aircraft. The documents are created to be viewed in printed form. However, such documents are commonly stored in electronic form and viewed on a display device of a data processing system. As a result, the reader looks through different documents that may be on different types of media. This type of review may be more time-consuming than desired to find information about an aircraft.

Documents regarding a complex system of systems such as an aircraft may therefore contain large amounts of information regarding the complex system and its components, subsystems and parts, and the connections and relationships among the respective elements of the complex system. The complexity of the system and the large amount of information often required to describe the system may increase not only the time required to study the documents, but the difficulty in comprehending the complex system and its elements. A user may not only require the time to review documents containing large amounts of information, but may also require the time and endure the difficulty of studying the information to understand the ways in which the complex system and its elements relate to each other.

Therefore, it may be desirable to have a method and apparatus that takes into account at least some of the issues discussed above, as well as possibly other issues.

BRIEF SUMMARY

Example embodiments of the present disclosure are generally directed to a panoptic visualization document layout system, and corresponding method and computer-readable storage medium. In accordance with example embodiments, media content of a document collection may be panoptically arranged in a manner that reflects logical relationships between the content, such as according to a structure of the document. The arrangement may enable a user to see the content in a single view, and in an arrangement that facilitates a better understanding of the relationships between the content and the subjects or objects depicted by the content, which may be otherwise difficult to comprehend. In the context of a complex system such as an aircraft including a number of components, subsystems and parts, the arrangement may not only lessen the time required to review documents containing large amounts of information, but may also lessen the time required and ease the difficulty studying the information to understand the ways in which the complex system and its elements relate to each other. Various ones of the relationships may be customizable, which when reflected in a panoptic arrangement, may further facilitate the understanding of various users. Example embodiments may therefore ease the difficulty and time required to search even the most massive amounts of information contained in some document collections.

According to one aspect of example embodiments, a system is provided for panoptic visualization of a document having a structure defined according to a particular schema, which structure in one example may be reflected in the media content of the one or more pages of the document, or encoded in the document. The system includes a document parser, colligater and layout engine. The document parser is configured to receive and disassemble an electronic document into a plurality of constituent pages each of which includes respective media content. The colligater is configured to colligate the pages, including being configured to provide associated metadata for each page of the plurality. The associated metadata identifies a link between the page and one or more other pages of the plurality, and the link establishes a logical relationship between the respective pages according to the structure of the document. The layout engine is in turn configured to generate a layout of pages of the document, and communicate the layout. In this regard, the layout includes a panoptic arrangement of visual representations of the pages of the layout according to the associated metadata of the respective pages.

The system may also include a search engine coupled to the layout engine and configured to receive a request for media content and identify a page including the requested media content, with the identified page being of the document. In this example, the layout engine may be configured to retrieve pages of the document including the identified page and other page(s) identified according to the associated metadata for the identified page. In this regard, the respective associated metadata may further include information identifying link(s) between the identified page and respective other page(s). Also in this example, the layout engine may be configured to generate a layout of the retrieved pages.

In one example, the system may further include a navigation engine coupled to the layout engine and configured to select navigation option(s) from a plurality of navigation options for navigating a visual presentation of the layout. In one example, the navigation engine is configured to select the navigation option(s) according to the associated metadata for the pages of the layout. The navigation engine may also be configured to communicate the selected navigation options.

In one example, the associated metadata for each page also includes information specifying a size, location and/or depth of the visual representation of the respective page in the layout, according to which the layout engine may be configured to generate the layout. In a further example, for each of one or more of the pages of the layout, the page may be in a state including visual representations at respective resolutions of the page, and the associated metadata may provide information specifying at least the size of the visual representation of the respective page in the layout. For each of one or more of the pages of the layout, then, the layout engine being configured to generate the layout may include being configured to retrieve the page for the visual representation at a resolution that matches the size specified by the information provided in the associated metadata. And in one example, for each of one or more of the pages of the layout, the associated metadata may provide information specifying at least the size of the visual representation of the respective page in the layout, with the size being specified relative to one or more others of the retrieved pages.

In other aspects of example embodiments, a method and computer-readable storage medium are provided for panoptic visualization of a document The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the disclosure in general terms, reference will now be made to the accompanying drawings, which are not necessarily drawn to scale, and wherein:

Figure 17:
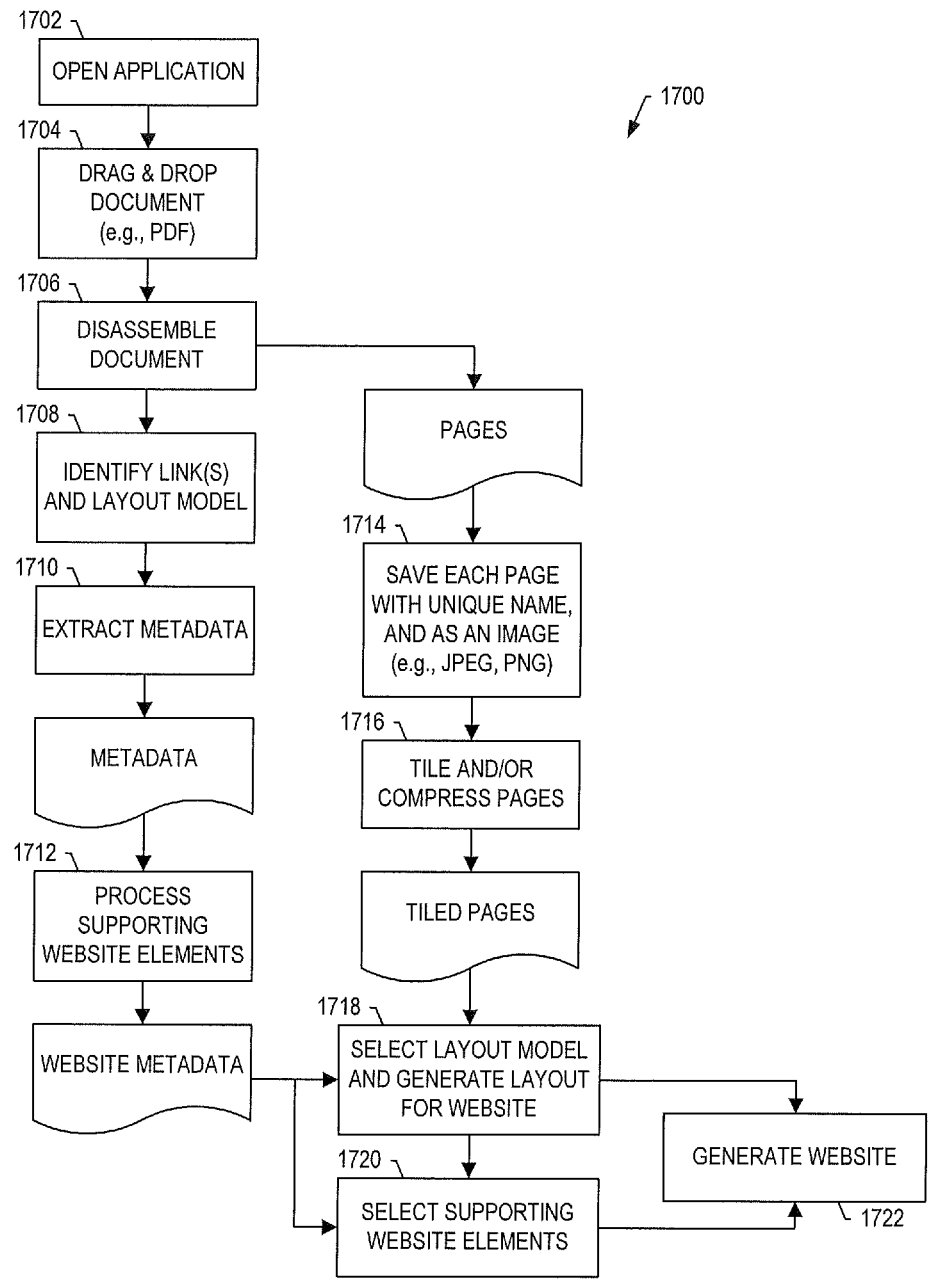

FIGS. 5-16, which schematically illustrate examples of suitable layout models according to example embodiments;

FIG. 17 is an operational diagram of operations that may be performed by a panoptic visualization system according to one example embodiment; and FIGS. 18-23 depict example layouts of pages that may be displayed in a GUI that has a predetermined viewable area, and which may be navigated by a user, according to an example embodiment of the present disclosure.

DETAILED DESCRIPTION

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example embodiments of the present disclosure relate generally to panoptic visualization of documents and, in particular, to panoptic visualization of documents or their document components in a manner that reflects logical relationships between the documents/components according to their structure. Example embodiments will be primarily described in conjunction with aerospace applications. It should be understood, however, that example embodiments may be utilized in conjunction with a variety of other applications, both in the aerospace industry and outside of the aerospace industry.

Figure 1:
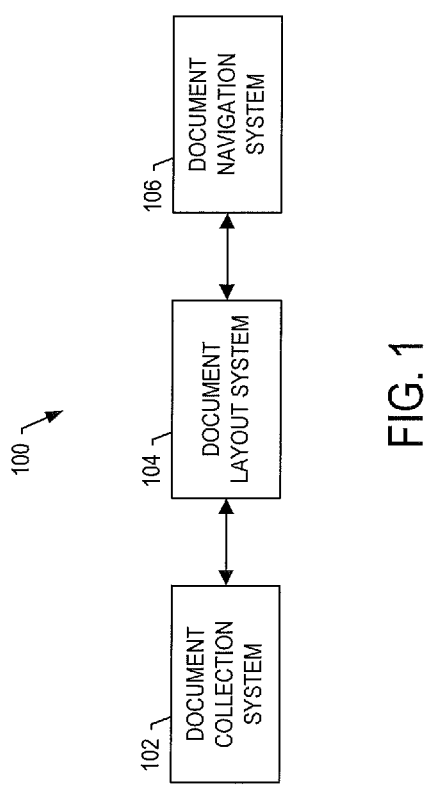
FIG. 1 is an illustration of a panoptic visualization system in accordance with an example embodiment.

Referring now to FIG. 1, a panoptic visualization system 100 is illustrated according to example embodiments of the present disclosure. The system may include any of a number of different subsystems (each an individual system) for performing one or more functions or operations with respect to one or more electronic documents. As shown, for example, the system may include a document collection system 102, document layout system 104 and/or document navigation system 106. Although being shown as part of the panoptic visualization system, one or more of the document collection system, layout system and/or navigation system may instead be separate from but in communication with the panoptic visualization system. It should also be understood that one or more of the subsystems may function or operate as a separate system without regard to others of the subsystems. And further, it should be understood that the panoptic visualization system may include one or more additional or alternative subsystems than those shown in FIG. 1.

As described herein, an electronic document (or simply document) may be any electronic media content capable of being visualized in an electronic and/or printed (or printable) form. The media content of a document may include one or more of textual, graphical or other visual content such as still images, video or the like. The document may be of a number of different types of documents in which the type of document may be defined by one or more characteristics of the document such as its format, media content or the like. Examples of suitable types of documents include computer-aided design documents (e.g., CAD, CATDrawing, CATPart, CATProduct, CATProcess, cgr, DWG, DXF, DWF, etc.), text-based documents (e.g., ANS, ASC, DOC, DOCX, HTML, PDF, RTF, TXT, WPD, etc.), presentation documents (e.g., PDP, PPT, etc.), graphics documents (e.g., BMP, GIF, JPEG, JP2, PNG, PSD, PSP, RAW, TIFF, etc.), video documents (e.g., AVI, MPEG, QuickTime, WMV, etc.) or the like. Other examples of suitable types of documents include single or collections of legal documents (e.g., court decisions, briefs, patents, etc.), books, manuals, magazines or trade publications, articles, web pages, screenshots, service bulletins, engineering diagrams, warranties, technical drawings, wiring diagrams or the like. And still further examples of suitable types of documents include data sets such as engineering design data, wiring data, troubleshooting data, business data or the like.

A document may be composed of one or more constituent document components that may be groupings of its media content such as between basic breaking points. The document components may depend on the type of document and may include, for example, electronic pages, slides, diagrams, drawings, still images, videos or the like. The document component may at times be generally referred to as a "page," although the document component need not necessarily be an electronic page as it may include other types of components. In instances in which a document includes only one component, the document and its component may be one and the same.

As described herein, reference may be made to a document composed of constituent pages. It should be understood, however, that example embodiments may be equally applicable to a group (collection) of documents composed of constituent documents, which may or may not be further composed of constituent pages. Thus, functions performed with respect to a document may be equally performed with respect to a group of documents, and functions performed with respect to a page may be equally performed with respect to a constituent document.

Each page may be formed of data from which a visual representation of it (or rather its media content) may be generated in an electronic and/or printed (or printable) form. The visual representation of a page may at times be generally referred to as simply the page or as an "image," although the page need not necessarily include a still image as it may include other types of media content.

A page may include media content that has one or more subjects and includes one or more objects reflecting or otherwise forming the subject(s). At times, a page may therefore be said to depict its subject(s) and/or object(s) of its subject(s). As an example, a page may have an aircraft as its subject and include an exterior or interior view or sections of the exterior/interior view of the aircraft as object(s), or the page may have the exterior/interior view as its subject and include the sections of the exterior view as objects. As another example, a page may have an aircraft instrument panel as its subject and include gauges of the instrument panel as subjects.

In various examples, a document may be structured according to a particular schema, and in at least some instances may be structured in a hierarchical manner. For example, a book or manual may be structured into chapters each of which includes sections, subsections or the like. In each chapter, section or subsection, the book/manual may include media content, which again may include textual, graphical or other visual content such as still images, video or the like. In another example, a magazine or trade publication may be structured into articles, each of which may include media content. In yet another example, a collection of legal documents may be structured according to case, and for a case, documents may be structured in a time sequence according to their dates.

The structure of a document may be reflected in any of a number of different manners. In one example, the structure may be user-defined. In another example, the structure may be reflected in the media content of one or more pages of the document itself, such as in a table of contents. In yet another example, the structure may be encoded in the document such as by appropriate bookmarks, markup or the like. Examples of suitable markup include those based on the standard generalized markup language (SGML) including hypertext markup language (HTML), extensible markup language (XML), extensible HTML (XHTML) or the like. The schema according to which the document may be structured may be provided in any of a number of different manners, such as a document type definition (DTDs), XML schema, document structure description (DSD), regular language for XML next generation (RELAX NG) or the like.

In the aircraft industry, for example, Airlines for America (A4A), formerly the Air Transport Association of America (ATA) has released a number of specifications including schema for structuring aircraft maintenance and operations documents. The ATA iSpec 2200, for example, specifies DTDs for documents such as an aircraft illustrated parts catalog (AIPC), aircraft maintenance manual (AMM), aircraft recovery manual (ARM), component maintenance manual (CMM), component maintenance manual parts list (CMMIPL), consumable products manual (CPM), engine (shop) manual (EM), engine cleaning inspection and repair manual (CIR), engine illustrated parts catalog (EIPC), engine parts configuration management section (EPCM), fault reporting and fault isolation manual (FRM/FIM), flight crew operations manual (FCOM), illustrated tool and equipment manual (ITEM), intelligent graphics exchange (IGEXCFIANGE), maintenance planning document (MPD), maintenance review board report (MRB), maintenance steering group (MSG-3), master minimum equipment list (MMEL), non-destructive testing manual (NDT), power plant build-up manual (PPBM), power plant build-up manual illustrated parts list (PPBMIPL), production management database (PMDB), service bulletin (SB), service bulletin index (SBI), service description section (SDS), structural repair manual (SRM), system description sections (SDS), tool and equipment manual (TEM), weight and balance manual (WBM), wiring diagram manual (WM) or the like.

Generally, documents and/or their pages according to example embodiments may have one or more logical relationships between one another. As explained in greater detail below, then, the document collection system 102 of the panoptic visualization system 100 may be generally configured to receive documents and collect pages according to these logical relationships, with the pages being collected as a document collection for panoptic visualization (a panoptic visualization document collection). The document layout system 104 may be generally configured to generate a layout of panoptically-arranged, logically-related pages of a panoptic visualization document collection, such as the collection from the document collection system. The document navigation system 106 may be generally configured to select and provide navigation option(s) for navigating a visual presentation of a layout of panoptically-arranged, logically-related pages of a panoptic visualization document collection, such as the layout generated by the document layout system. The visual presentation of a layout may at times be generally referred to as simply the layout.

Example embodiments of the present disclosure may therefore collect pages of document(s) according to logical relationships between the pages, which in one example in the context of a complex system such as an aircraft, may reflect structural relationships between its elements. The pages may be panoptically arranged in a manner that reflects the logical relationships, and in various examples, structural relationships. The arrangement may enable a user to see the pages in a single view, and in a manner that facilitates a better understanding of relationships that may be otherwise difficult to comprehend. In the context of a complex system for example, the arrangement may not only lessen the time required to review documents containing large amounts of information, but may also lessen the time required and ease the difficulty studying the information to understand the ways in which the complex system and its elements relate to each other.

Figure 2:
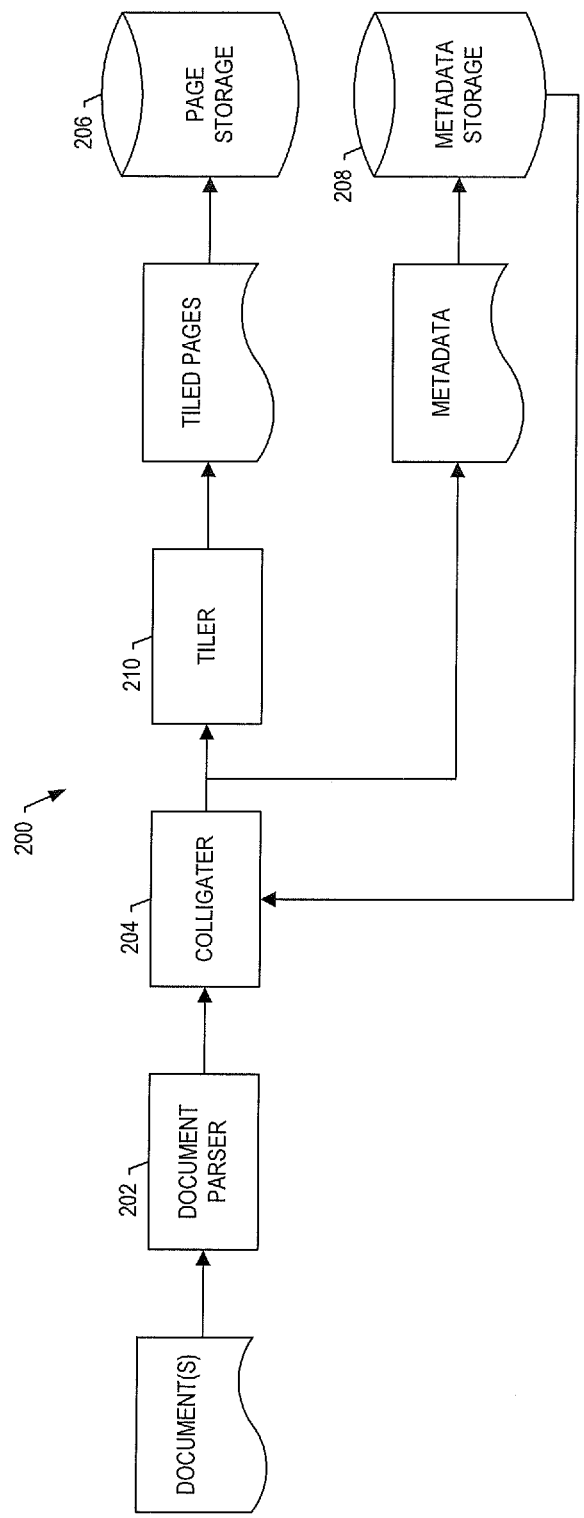
FIG. 2 is an illustration of a panoptic visualization document collection system in accordance with one example embodiment.
Figure 3:
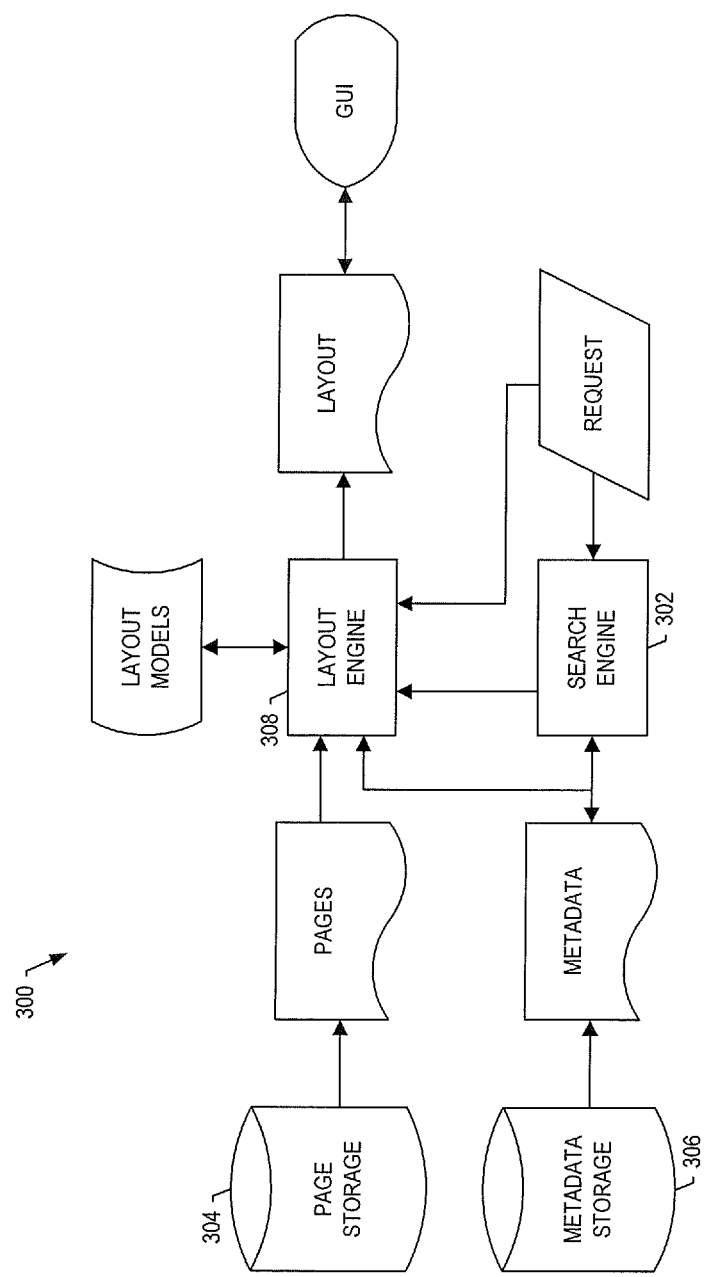
FIG. 3 is an illustration of a panoptic visualization document layout system in accordance with one example embodiment.
Figure 4:
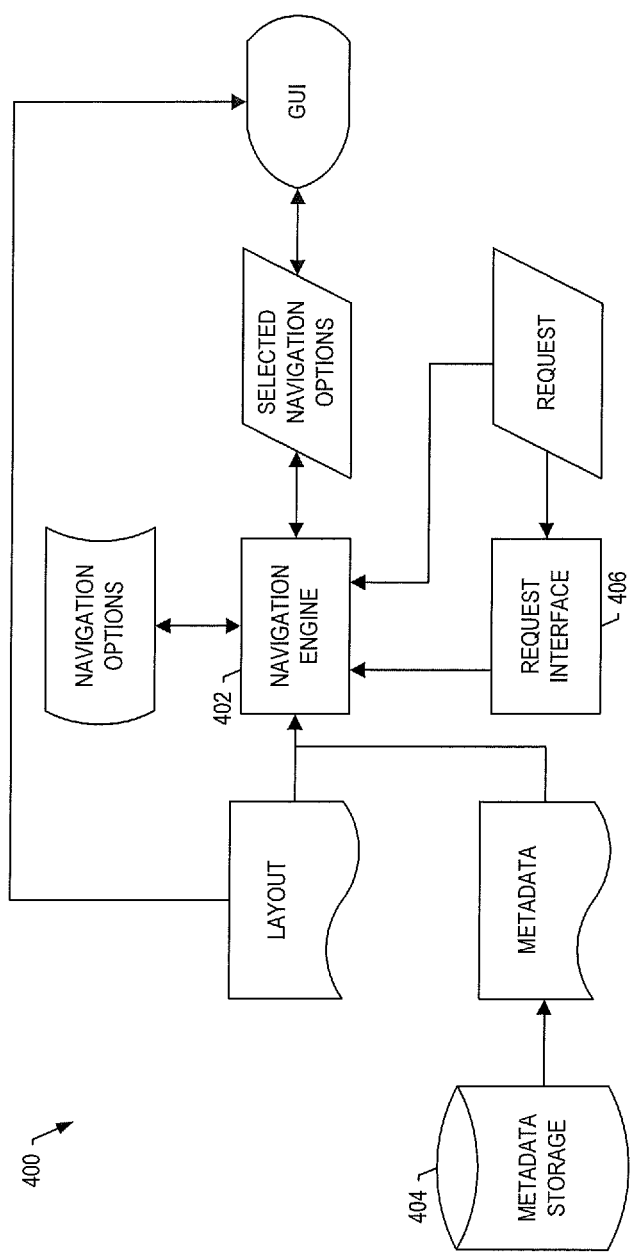
FIG. 4 is an illustration of a panoptic visualization document navigation system in accordance with one example embodiment.

Reference will now be made to FIGS. 2, 3 and 4, which illustrate more particular examples of a suitable document collection system, document layout system and document navigation system, respectively, according to example embodiments of the present disclosure.

FIG. 2 illustrates a document collection system 200 according to one example embodiment. As shown, the document collection system may include a document parser 202 configured to receive and disassemble one or more electronic documents into a plurality of constituent pages (document components) each of which includes respective media content. The documents in one example may be disassembled according to the type of the documents (e.g., computer-aided design documents, presentation documents, graphics documents, video documents, legal documents, books, articles, web pages, engineering diagrams, technical drawings, wiring diagrams, etc.). The document parser may therefore also be configured to identify the type of the documents, such as based on the format of the documents, business rules or by user input.

The document collection system 200 may also include a colligater 204 coupled to the document parser 202 and configured to colligate the pages. In this regard, the colligation of the pages may include, for each of one or more pages of the plurality, the colligater being configured to identify one or more links between the page and one or more other pages of the plurality. The link(s) of one example may be identified according to the documents, type of documents, and/or media content of the page and other page(s). In a more particular example, the link(s) may be identified according to the structure of the document, which as indicated above, may be defined according to a particular schema. And in one example, the link(s) may be defined in a number of different manners, such as according to one or more business rules, logic, schema or the like. These link(s) may establish one or more logical relationships between the page and other page(s).

In one example, a link may be identified between pages sharing a common document (constituents of the same document). In one example, a link may be identified between pages adjacent one another in a predetermined sequence, such as a time sequence, spatial sequence or an order sequence in a common document or collection of documents. In some instances, a link may be identified according to the subject(s) or object(s) of the pages. For example, a link may be identified between pages sharing a common subject or common object. In one example, a link may be identified between pages in which an object of one is a subject of the other (object-subject), or in which a subject of one is an object of the other (subject-object).

In one example, a link may be identified between pages related by a parent-child relationship, whether directly or indirectly by children sharing a common parent. In one example, a link may be identified between pages in instances in which one of the pages includes a reference or link to the other page in its media content. In this regard, a court decision may include a citation to another court decision (e.g., in the body of the court decision, or in a footnote, endnote or the like), or a page may include a hyperlink to another page. And in yet another example, a link may be identified between pages by user input specifying a link between pages.

In a more particular example, link(s) may be identified according to the document's structure. The document's structure may indicate a link between pages sharing a common document (constituents of the same document). The document's structure may also indicate link(s) between pages having a parent-child relationship, whether directly or indirectly by children sharing a common parent. The structure of a book/manual may indicate a link between its pages, and may also indicate link(s) between pages of respective chapters. Even further, the structure of the book/manual may indicate link(s) between pages of respective sections, subsections or the like. And the link(s) provided by the structure may be identified in addition to or in lieu of other links that may be identified, such as in any of the manners provided above.

In addition to identifying link(s) between pages, the colligator 204 may also be configured to extract, generate or otherwise provide, for each of one or more pages, metadata associated with the page. For a page, its associated metadata may provide any of a number of different pieces of information about the page. For example, the metadata may provide information identifying the link(s) between the page and other page(s) in metadata associated with the page. This information may include the names or other identifiers of the other page(s) linked to the page, and may also include an indication of the logical relationship(s) established by the link(s) therebetween (e.g., share common document, subject and/or object, adjacency, object-subject subject-object, parent-child, reference/link, user specified, etc.).

In addition to the link(s), the associated metadata for a page may include one or more other pieces of information about the page. For example, the metadata may provide information about the document or type of document for which the page is a constituent. Information regarding the document may include the name or other identifier of the document, and/or an author, size, and/or time of creation or last revision of the document. The metadata may provide information regarding the structure of the document and/or schema according to which the document is structured. Also for example, the metadata may provide information about one or more content restrictions applied or to be applied to the page, such as access restrictions, editing or modification restrictions, and/or encryption of the page.

The metadata may also provide information about the media content of the page. This information may include, for example, identification of the page's subject(s) and/or object(s), the portion of the page including one or more of the object(s), and/or a level of detail of one or more of the object(s) in the page. In various instances, a link between pages sharing a common subject, object or having an object-subject or subject-object relationship may be inferred from the metadata identifying the respective documents' subject(s) and/or object(s). In these instances, specification of a page's subject(s) and/or object(s) may suffice as information identifying the appropriate link(s) between pages.

In one example, the colligation of pages may further include the colligater 204 being configured to identify one or more layout models for at least some of the pages. In this example, the associated metadata extracted, generated or otherwise provided by the colligater for a page may further include information specifying an arrangement of the respective page in each of one or more of the layout models. For a respective layout model, this may include, for example, specifying a size, location and/or depth (z-order) of the page (or more particularly its visual representation). The layout model(s) may be identified and size, location and/or depth may be specified in any of a number of different manners, such as according to one or more business rules, logic or the like. Examples of suitable layout models (sometimes referred to as styles of presentation) include brickwall, partial brickwall, hierarchy, shape, center out, top-down/triangulated, center-out triangulated, size dominance, overlap through detail, master-detail through depth, load shape, facet, mixed-media/static-and-dynamic or the like. Other examples may include combinations of one or more of the foregoing layout models. Each of a number of example layout models will be further described below.

In one example, the size of a page in a layout model may be specified as an absolute size or a relative size, either of which may be given in a number of different manners. In various instances, the size of the page may relate to a size in pixels and therefore give a pixel count or pixel resolution of the page. In one example, the absolute size of a page may be given in height and width dimensions (e.g., N×M pixels). In another example, the size of the page may be specified as a relative size based on the size of one or more other pages to which the page is logically related. For example, the relative size may be given in a number of different manners, such as in a percentage, fraction or multiple of other page(s); or the relative size may be given simply by an indication of smaller than, larger than or equal in size to other page(s). In pages related by a parent-child relationship, for example, the size of the child page may be specified as being half the size of its parent. In any event in which the size is relative, the size of the respective other page(s) may be given in their associated metadata, and may be given as an absolute size or relative size based on the size of even further other pages.

Similar to size, in one example, the location (sometimes referred to as position) of a page in a layout model may be specified as an absolute location or relative location, but in either event, may be given in a number of different manners. Likewise, the depth of a page in a layout model may be specified as an absolute depth or relative depth, either of which may be given in a number of different manners. For example, the absolute location of the page may be given in x, y coordinates of a coordinate system that spans the layout model, and/or the absolute depth may be given in a z coordinate of the coordinate system. In another example, the relative location of the page may be given in x, y coordinates relative to a point or other page(s) in the layout model. In yet another example, the relative location may be given simply by an indication of above, below, left or right of a point or other page(s) in the layout model. Similarly, in one example, the relative depth may be given simply by an indication of a page being in-front or behind other page(s) in the layout model. In any event in which the location and/or depth is relative, the location and/or depth of the respective other page(s) may be given in their associated metadata, and may be given as an absolute or relative location and/or depth.

The colligater 204 may be configured to communicate the pages and metadata as a panoptic visualization document collection, and communicate the collection to any of a number of different destinations. In one example, the colligater may be configured to communicate the pages and metadata to respective storage 206, 208 for later retrieval. The storage may be resident with the document collection system 200, or may be separate from and in communication with the document collection system. The pages and metadata may be formatted and stored in any of a number of different manners, and hence, their storage may be of any of a number of different types. Examples of suitable types of storage include file storage, database storage, cloud storage or the like.

In various examples, before pages are stored in respective storage 206, the pages may be compressed or otherwise processed for easier storage and retrieval. As shown, for example, the system may include a tiler 210 coupled to the colligater, and to which the colligater is configured to communicate the pages. The tiler may be configured to generate, for each of one or more pages, visual representations of the page at respective resolutions for zoom levels of the page. As described herein, the page (or rather its visual representation) at each zoom level may be generally referred to as a "sub-image," and may at times be considered a separate version or copy of the page. As suggested above, however, a sub-image of a page need not necessarily include a still image as the page may include other types of media content.

In addition to or in lieu of generating sub-images of a page, the tiler 210 may be configured to divide the sub-images across the zoom levels into progressively larger numbers of tiles each of which covers a spatial area of a sub-image at a respective zoom level. This may facilitate retrieval, panning and/or zooming of the page, as explained further below. The tiler may then be further configured to communicate the tiles of the sub-images of the pages, such as to the page storage. Before communicating the tiles, however, the tiler may be further configured to compress the tiles, if so desired.

In one more particular example, the tiler 210 may be configured to generate multiple resolutions of a page at respective zoom levels arranged hierarchically from a top zoom level through one or more intermediate zoom levels to a base zoom level. Each zoom level includes a sub-image of the entire page but at a different resolution; and the sub-images of the page across zoom levels may have the same native aspect ratio (ratio of the width of the image to its height). In one example, the top zoom level (level 0) may include a sub-image of the entire page at its lowest resolution, the one or more intermediate zoom levels may include a sub-image of the entire page at progressively higher resolutions (level 1 immediately below level 0, level 2 immediately below level 1, etc.), and the base zoom level (level L) may include a sub-image of the entire page at its highest (or full) resolution.

Each sub-image of a page may be generated in any of a number of different manners. In one example, one of the sub-images may be received by the tiler 210, such as the full-resolution sub-image. The tiler may then be configured to generate the other sub-images at lower resolutions, such as by downsampling the full-resolution sub-image.

As indicated, the tiler 210 may be configured to divide sub-images across zoom levels into progressively larger numbers of tiles each of which covers a spatial area of a sub-image at a respective zoom level. The tiles may have a fixed size (resolution) within and across the zoom levels, and accordingly, a sub-image composed of a larger number of tiles may generally have a higher resolution than a sub-image composed of a smaller number of tiles. Each zoom level may therefore be considered a higher zoom level relative to any zoom level above it (the sub-image at the zoom level being at a higher resolution than the sub-image at any zoom level above it). Similarly, each zoom level may be considered a lower zoom level relative to any zoom level below it (the sub-image at the zoom level being at a lower resolution than the sub-image at any zoom level below it).

In one example, the sub-image at each zoom level may be half the resolution of the zoom level immediately below it, and twice the resolution of the zoom level immediately above it (the resolutions increase or decrease by a factor of two). In this example, the number of tiles in a zoom level/may be given by $t_l = t_0 \times 4^l$, in which l=0, 1, 2, L, and $t_0$ represents the number of tiles in the top zoom level (level 0). In a more particular example including four zoom levels 0, 1, 2 and 3 (L=3), and in which the top zoom-level sub-image is composed of 1 tile ($t_0$=1), the first intermediate zoom-level (level 1) sub-image may be composed of 4 tiles, the second intermediate zoom-level (level 2) sub-image may be composed of 16 tiles, and the base zoom-level (level 3) sub-image may be composed of 64 tiles.

In one example, a page covered by a number of tiles in one zoom level may be covered by an increased or decreased number of tiles in higher or lower zoom levels, respectively, thereby leading to an increase or decrease in resolution of the page. Similarly, an area of a page covered by one tile in one zoom level may be covered by multiple (e.g., four) tiles in an adjacent higher zoom level, thereby leading to an increase in resolution of the respective area of the page. And an area of a page covered by multiple tiles in one zoom level may be covered by one tile in an adjacent lower zoom level, thereby leading to a decrease in resolution of the respective area of the page.

In one example, a page (or area thereof) at a particular resolution may be displayed by the tile(s) covering the page at the zoom level commensurate with the particular resolution. A zoom-in of the page may be effectuated by replacing the displayed tile(s) with the increased number of tiles covering the page at a higher zoom level. And a zoom-out of the page may be effectuated by replacing the displayed tiles with the decreased number of tile(s) covering the page at a lower zoom level. And because the page may be divided into tiles, in instances in which a portion but not all of a page is viewable in a graphical user interface (GUI) in which the page is displayed, only those tiles covering the viewable portion of the page may be retrieved and displayed.

Reference is now made to FIG. 3, which illustrates a document layout system 300 according to one example embodiment. As indicated above, the document layout system 300 may be one example of the document layout system 104 of the panoptic visualization system 100 of FIG. 1. The document layout system may be generally configured to generate a layout of panoptically-arranged, logically-related pages of a panoptic visualization document collection. This collection may be, for example, the collection from the document collection system 102, or more particularly in one example, the document collection system 200 of FIG. 2.

As shown in FIG. 3, the document layout system 300 may include a search engine 302, request interface or the like configured to receive a request for media content and identify one or more pages including the requested media content. The identified page may be of a panoptic visualization document collection having a plurality of pages each of which includes respective media content and has associated metadata providing information about the respective page. The pages and metadata may be stored in respective storage 304, 306, which in one example may correspond to respective storage 206, 208 shown in FIG. 2.

The search engine 302 may be configured to identify page(s) in a number of different manners, such as based on the associated metadata of the pages of the collection. For example, the request may include a keyword matching or otherwise having relevance to a subject or object of page(s) of the collection. In response to the request, then, the search engine may be configured to search the metadata storage 306 for the associated metadata of one or more page(s) including media content matching or relevant to the request.

The document layout system 300 may also include a layout engine 308, layout generator or the like coupled to the search engine 302 and configured to select a layout model (style of presentation) from a plurality of layout models for panoptically-arranged pages of the plurality, including the identified page. The layout models may be maintained in a respective storage such as file storage, database storage, cloud storage or the like, and formatted and stored in any of a number of different manners according to the respective storage.

The layout models may include any of a number of different types of layouts for panoptically arranging pages. As indicated above and explained further below, examples of suitable layout models include brickwall, partial brickwall, hierarchy, shape, center out, top-down/triangulated, center-out triangulated, size dominance, overlap through detail, master-detail through depth, load shape, facet, mixed-media/static-and-dynamic or the like. Other examples may include combinations of one or more of the foregoing layout models.

The layout engine 308 may be configured to select the layout model in any of a number of different manners. In one example, the layout engine may be configured to select the layout model according to the associated metadata for the identified page. The search engine 302 may therefore be configured to communicate the associated metadata for the identified page to the layout engine, which in turn, may be configured to select a layout model according to the respective associated metadata.

As explained above, the associated metadata for a page may provide information about the type of document of which the page is a constituent, and/or information about media content of the page. In one example, then, the layout engine 308 may be configured to select the layout model according to the type of the document of which the identified page is a constituent (e.g., computer-aided design document, presentation document, graphics document, video document, legal document, book, article, web page, engineering diagram(s), technical drawing(s), wiring diagram(s), etc.). In another example, the layout engine may be configured to select the layout model according to the structure of the document of which the identified page is a constituent, and/or schema according to which the respective document is structured. In yet another example, the layout engine may be configured to select the layout model according to the media content of the identified page, such as one or more of its subject(s) and/or object(s).

As also explained above, the associated metadata for a page may include information identifying link(s) between the page and other page(s) of the collection. The layout engine 308 may therefore also be configured to retrieve the identified page and other page(s) identified according to the associated metadata for the identified page. These pages may be retrieved from respective storage 304.

The layout engine 308 may be configured to generate a layout of the retrieved pages, panoptically-arranged according to the selected layout model, and the retrieved pages and their associated metadata. In addition to retrieving the pages, then, the layout engine of one example may also be configured to receive the associated metadata, such as from respective storage 306. The layout engine may then be configured to communicate the layout, such as to a GUI in which a layout may be displayed, or a printer for generating a printout of the layout.

As suggested, the layout may define a panoptic arrangement of the retrieved pages according to the selected layout model. In the arrangement of the layout, the pages may each have a particular size, location and/or depth (z-order). The size, location and/or depth of each page of the layout may be absolute or relative to other page(s) of the layout, and may be specified or otherwise determinable in a number of different manners. In one example, the sizes, locations and/or depths may be specified or otherwise determinable from a definition of the selected layout model of the layout models. Additionally or alternatively, for example, the associated metadata for each page of the layout may provide information specifying the size, location and/or depth (z-order) of it in the layout, as explained above. In these examples, the layout engine 308 may be configured to generate the layout according to the sizes, locations and/or depths specified by the selected layout model and/or associated metadata of the pages of the layout.

The aspect ratios of the pages may be their native aspect ratios. In various instances, however, a layout model may specify or otherwise define, for each of one or more pages, an aspect ratio that is different from the native aspect ratio of the respective page. In these instances, the layout engine 308 may be further configured to generate the layout according to the different, non-native aspect ratio(s) for the page(s).

In one further example, one or more of the pages of the layout may be in a state including visual representations (e.g., sub-images) at respective resolutions. For each of these pages, the layout engine 308 may be configured to retrieve the page for the visual representation at the resolution that matches or most closely matches the size specified by the selected layout model and/or associated metadata. This may include, for example, retrieving the sub-image of the page at or closest to the respective resolution.

The layout generated by the layout engine 308 may be dynamically generated according to a selected layout model such that a different layout of the pages may be realized by changing the selected layout model. A different layout may also be realized in a number of other manners, such as based on associated metadata of the pages of the layout or one or more time-based factors. In one example, the layout engine may therefore be further configured to receive a request for a different panoptic arrangement of the retrieved pages. In this example, the layout engine may be configured to select a different layout model from the plurality of layout models in response to the request. The layout engine may then be configured to generate a different layout of the retrieved pages. This may include the layout engine being configured to panoptically rearrange the retrieved pages according to the selected different layout model, and the retrieved pages and associated metadata for the retrieved pages.

As indicated above, the layout models may include any of a number of different types of layouts for panoptically arranging pages. In the layout models, logical relationship(s) established by link(s) between pages may be expressed by the arrangement of pages, in either or both of location or depth (z-order). In one example, logical relationships may be expressed by the proximity of pages to one another in their locations, and/or in their relative depths. Additionally, one or more of the layout models may define or imply a navigation path between documents related to one another, and/or a load shape for loading pages of a layout generated according to the respective layout models. Reference will now be made to FIGS. 5-16, which schematically illustrate examples of suitable layout models. As shown, these examples include brickwall, partial brickwall, hierarchy, shape, center out, top-down/triangulated, center-out triangulated, size dominance, overlap through detail, master-detail through depth, load shape, facet, mixed-media/static-and-dynamic or the like.

Figure 5:
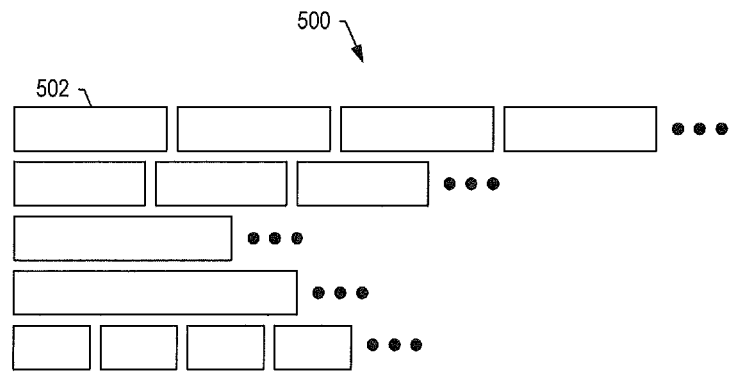

FIG. 5 illustrates a brickwall layout model 500 according to one example embodiment in which pages 502 may be arranged in one or more rows and one or more columns. As shown, the brickwall layout model may be characterized by a consistent end-to-end orientation with the pages being consistent in size and/or aspect ratio along one or more rows and/or columns. This type of layout model may be used for general search results. In one example, the layout model may provide a horizontal orientation related to chapter location, with a vertical orientation associated with a progressive increase in page length.

Although not separately shown, a partial brickwall layout model may be considered a superset of the brickwall layout model 500. The partial brickwall layout model may be characterized by clusters of pages that may similarly be consistent in size and/or aspect ratio at least within respective clusters. In this layout model, the clusters may be related by associated metadata of the respective pages, such as by their media content, author, time of creation, last revision or the like.

Figure 6:
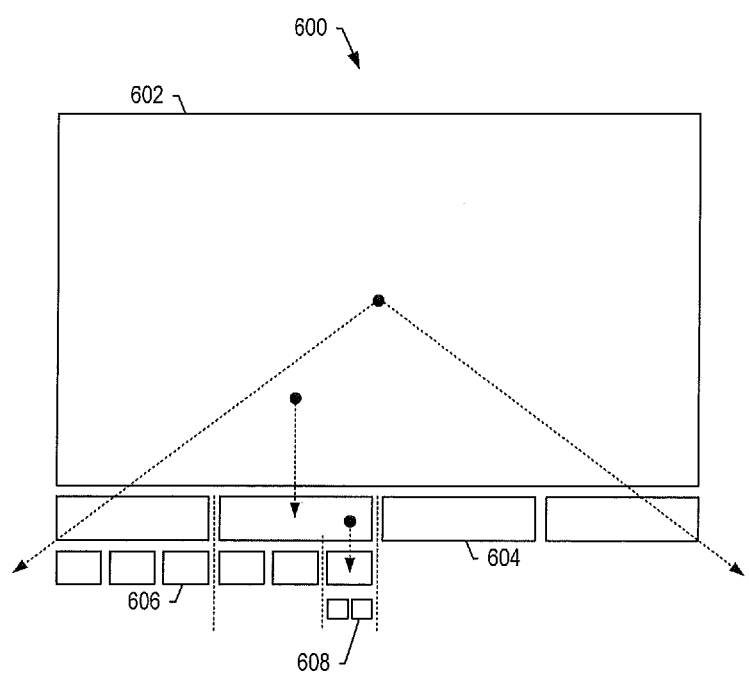

FIG. 6 illustrates a hierarchy layout model 600 according to one example embodiment in which pages may be arranged in a hierarchy in location and/or size. A hierarchical relationship between pages (hierarchically-related pages) may be indicated by their associated metadata in a number of different manners. For example, a hierarchical relationship may be indicated by a parent-child relationship between pages.

In another example, a hierarchical relationship may be indicated by an object-subject or subject-object relationship in which an object of one page higher in a hierarchy may be subject(s) of other page(s) lower in the hierarchy, and in which at least some of the respective other page(s) may be at the same level in the hierarchy. In this example, the subject of the one page may be a master view, and the subject(s) of the other page(s) may be detailed view(s) of object(s) of the master view. In yet another example, a hierarchical relationship may be indicated by a relationship in which one page higher in a hierarchy includes reference(s) or link(s) (e.g., citation, hyperlink, etc.) to other document(s) lower in the hierarchy, in which at least some of the respective other document(s) may be at the same level in the hierarchy.

In one example of the hierarchy layout model 600, pages higher in a hierarchy may be located above those lower in the hierarchy (top-down), and/or may be larger in size than those lower in the hierarchy. The pages in this layout model may not be consistent in size or aspect ratio. Those pages higher in the hierarchy may dominate those lower in the hierarchy, and in which pages lower in the hierarchy may be constrained in the x-direction by the width of pages higher in the hierarchy.

More particularly, for example, the highest page 602 in the hierarchy may be located at the top, and may be sized according to the page's full resolution with its native aspect ratio. The next-highest page(s) 604 in the hierarchy may be located immediately below the highest page at a size smaller than the highest page, and with an aspect ratio that constrains the next-highest page(s) collectively to the width of the highest page. This pattern may repeat for the third-highest page(s) 606 in the hierarchy below respective ones of the next-highest pages, for the fourth-highest page(s) 608 in the hierarchy, and so forth. This layout model may in one example provide a single page with related pages cited in the respective page below it.

Figure 7:
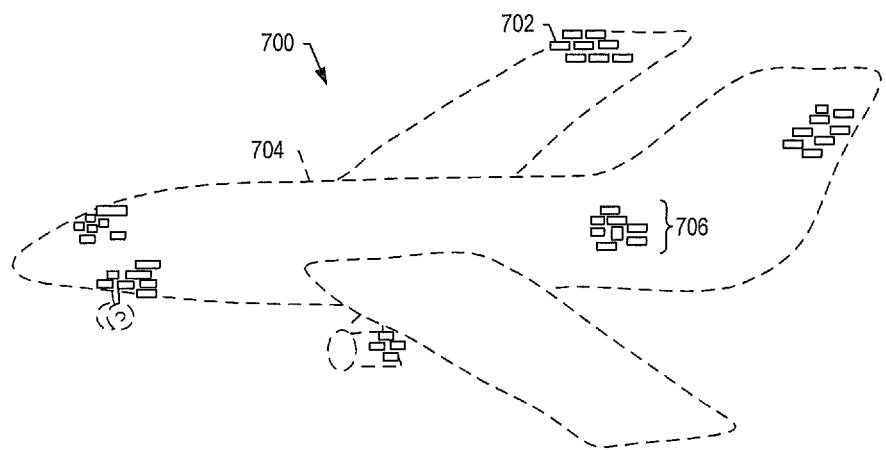

FIG. 7 illustrates a shape layout model 700 according to one example embodiment in which the model mimics a physical structure to which the pages relate, such as an aircraft or the geography of the United States. In one example, pages 702 may be arranged within boundaries of a visual representation 704 of the physical structure (two or three-dimensional representation), where the location(s) of page(s) may coincide with relationship(s) their media content to the structure. For example, pages related to the wing tip area of an aircraft (e.g., by subject or object) may be located in the respective area of the visual representation of the aircraft. In another example, pages related to court decisions from different states of the United States may be located in areas of the visual representation of the United States coinciding with the states in which the decisions were rendered.

In the shape layout model 700, in various instances, one or more subsets of the pages may be arranged in clusters 706 at respective areas of the visual representation of the physical structure. In these instances, the clusters may each be arranged according to another of the layout models, both in terms of location and size of the pages of the cluster.

Figure 8:
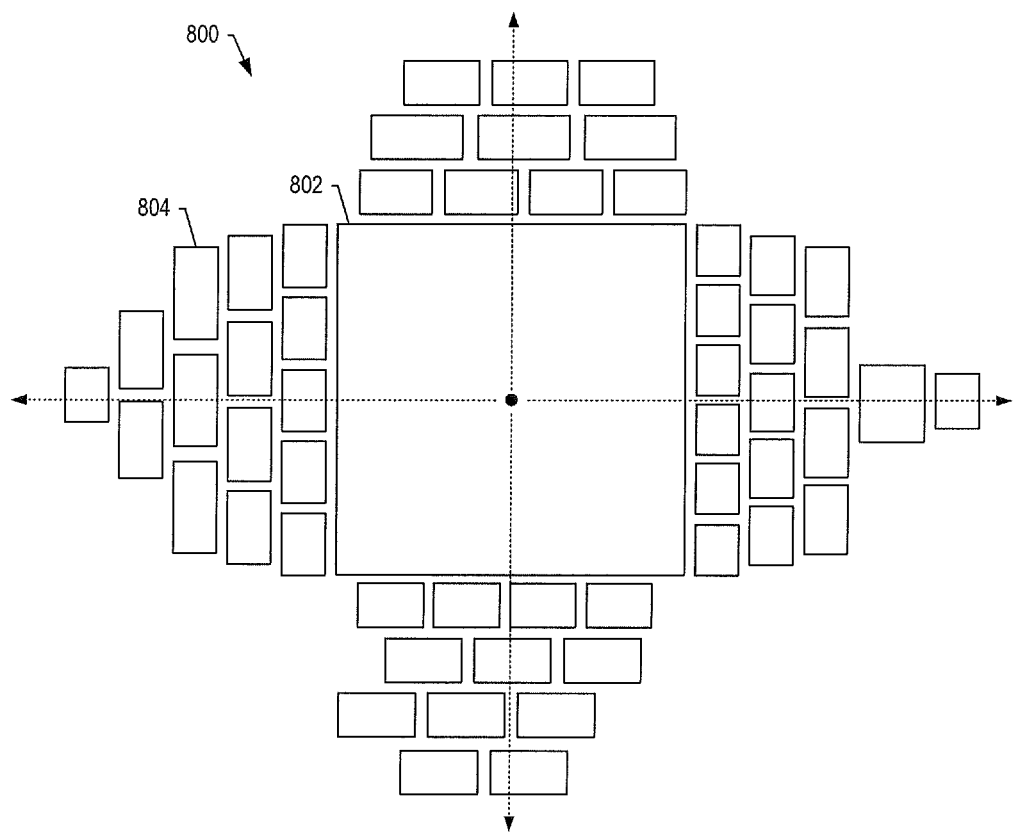

FIG. 8 illustrates a center-out layout model 800 according to one example embodiment. This layout model may be characterized by a dominating, centrally-located primary page 802—such as a page identified by a search engine (e.g., search engine 302) searching for media content. Pages 804 related to the primary page (e.g., hierarchically-related) may be located around the primary page in a 360-degree arrangement. The pages in this layout model may not be consistent in size or aspect ratio. In one example, this layout model may indicate that the primary page has a relation to pre (upper), post (lower) and contemporaneous (beside) pages. An example of this type of layout may be a collection of documents or web pages that have been cross-hyperlinked together with the pages being part of a document tree that leads to the center, primary page.

Figure 9:
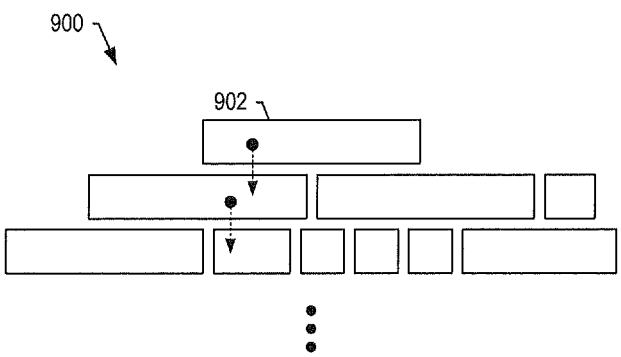

FIG. 9 illustrates a top-down/triangulated layout model 900 according to one example embodiment. This layout model may be similar to a combination of the brickwall layout model 500 and hierarchy layout model 600, and may be characterized by a top-down arrangement of hierarchically-related pages 902. Similar to the brickwall layout model, the pages in this layout model may be consistent in size and/or aspect ratio at least within pages at the same level of the hierarchy, which may indicate the importance of the pages relative to one another. Similar to the hierarchy layout model, in one example, pages higher in the hierarchy may be above (in the y-direction) pages lower in the hierarchy; but in contrast to the hierarchy layout model, the widths of the lower pages may not be constrained by the higher pages in the x-direction. In one example, the top-down/triangulated layout model may provide a single page as a node in a graph tree of related pages.

Figure 10:
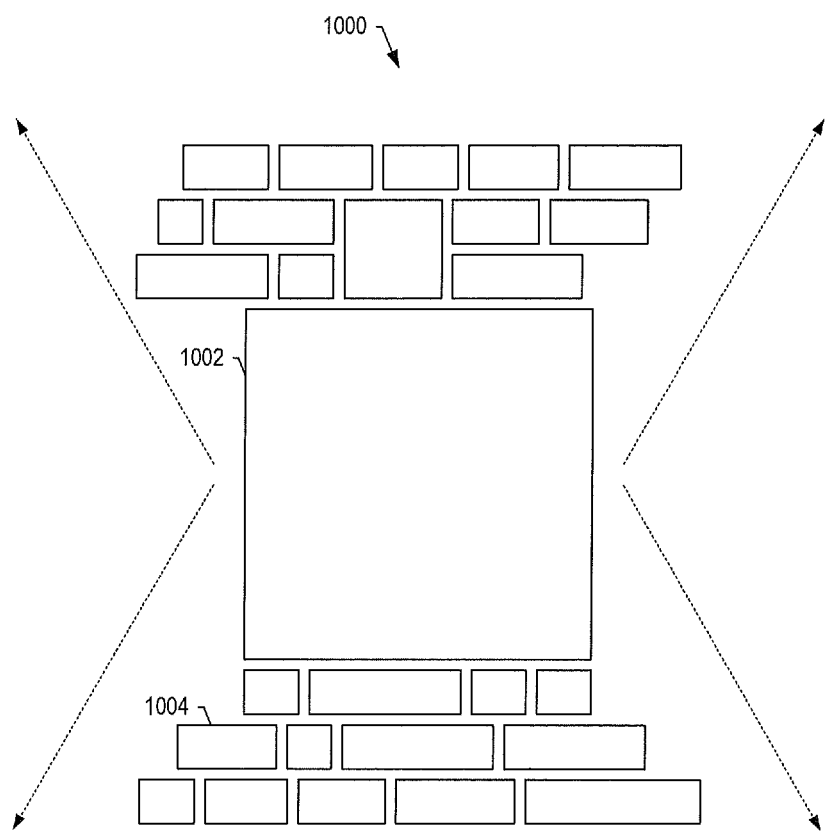

FIG. 10 illustrates a center-out triangulated layout model 1000 according to one example embodiment. This layout model may be characterized by a dominating, centrally-located primary page 1002, similar to the center-out layout model 800. In the center-out triangulated layout model, pages 1004 related to the primary page (e.g., hierarchically-related) may be located above and/or below the primary page. Also similar to the center-out layout model, the pages of the center-out triangulated layout model may not be consistent in size or aspect ratio. The center-out triangulated layout model may indicate that the primary page has a relation to the pre (upper) and post (lower) pages. An example of this type of layout may be a collection of documents or web pages that have been hyperlinked together with the upper pages being part of the document tree that leads to the center, primary page, and the lower pages leading from the primary page.

Figure 11:
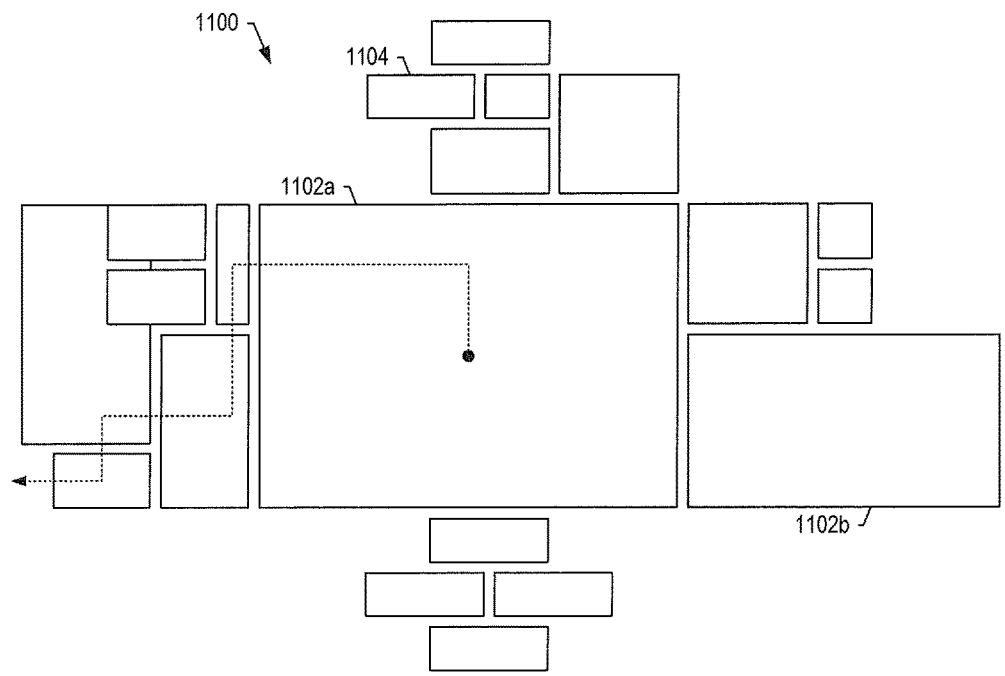

FIG. 11 illustrates a size-dominance layout model 1100 according to one example embodiment. This layout model may be similar to the center-out layout model 800. In this regard, the size-dominance layout model may be characterized by a dominating, centrally-located primary page 1102, and pages 1104 related to the primary page (e.g., hierarchically-related) located around the primary page in a 360-degree arrangement. This layout model, however, may include more than one primary page that may be the same size or different sizes, with two such pages 1102*a*, 1102*b* being shown. The pages in this layout model may not be consistent in size or aspect ratio. The size of the pages in this layout model may convey weight or relevance of the pages relative to one another. An example of this type of layout may be a collection of wiring diagrams that have associated reference(s) or link(s) on all four axes of at least the primary diagrams. The referenced/linked wiring diagrams/schematics may themselves include relationships to additional diagrams.

Figure 12:
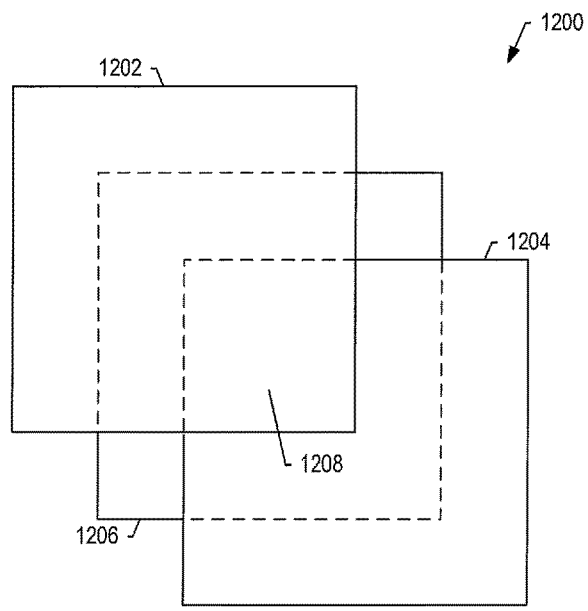

FIG. 12 illustrates an overlap-through-detail layout model 1200 according to one example embodiment. This layout model may be characterized by preservation of a hierarchical relationship between pages in the depth (z-order) in which they are arranged. In one example, a page 1202 higher in the hierarchy may overlay another page 1204 lower in the hierarchy, which in turn may overlay another page 1206 even lower in the hierarchy. In this layout, pages sharing one or more common objects or other media content may overlap 1208 so that the shared object(s)/other media content may at least partially spatially align across the pages.

Navigating a layout (or more particularly its visual presentation) may include zooming into or out of the presentation. Zooming into the layout according to the overlap-through-detail layout model 1200 may include increasing the size and, in various instances of one example, resolution of its pages. In this layout model, however, zooming into the layout may also include obscuring an overlaying page so that one or more overlaid pages (or rather the overlaid portions thereof) underneath it may come into view. Conversely, zooming out of a layout may also include showing an obscured overlaying page so that the respective page comes into view, and one or more overlaid pages (or rather the overlaid portions thereof) go out of view. In one example, obscuring a page may include increasing a transparency of the page (or decreasing its opacity) during a zoom-in, and showing a page may include increasing an opacity of the page (or decreasing its transparency) during a zoom-out.

In one example, as shown in FIG. 12, in an overlap-through-detail layout model 1200 including pages 1202, 1204, 1206, page 1202 may be obscured as a user zooms into the layout. At some point during the zoom-in, then, the respective page may no longer be viewable so that the layout appears to only include pages 1204, 1206. The zoom-in may further continue, obscuring page 1204 until it is no longer viewable, at which point the layout appears to only include page 1206. In these instances, obscured pages may remain in the layout, or the layout engine 308 may be configured to remove them from the layout.

Continuing the example of FIG. 12 in which only page 1206 is viewable and pages 1202, 1204 are obscured, page 1204 may be shown overlaying page 1206 as a user zooms out of the layout. At some point during the zoom-out, the respective page may be viewable so that the layout appears to include both pages 1204, 1206. The zoom-out may further continue, showing page 1202 until it is also viewable, at which point the layout appears to include pages 1202, 1204, 1206. In these instances, overlaid pages (or the overlaid portions thereof) may remain in the layout, or the layout engine 308 may be configured to remove them from the layout.

FIG. 13 illustrates a master-detail through depth layout model 1300 according to one example embodiment. This layout model is similar to the overlap-through-detail layout model 1200 in that a hierarchical relationship between pages may be preserved in their depth (z-order). In this layout model, however, an overlaid page (e.g., lower in the hierarchy) may be sized and arranged to be coincident with the entirety of an overlaying page (e.g., higher in the hierarchy).

Similar to the overlap-through-detail layout model 1200, navigation in the master-detail through depth layout model 1300 may include zooming into or out of the layout, which may further include obscuring or showing an overlaying page relative to an overlaid page. In the example shown in FIG. 13, navigating a layout including pages 1302, 1304, 1306 may include obscuring overlaying pages as a user zooms into the layout. Conversely, navigating the layout may include showing overlaying pages as the user zooms out of the layout. In this regard, implementing a zoom in the master-detail through depth layout model of multiple pages may be similar to implementing a zoom for a page including multiple sub-images.

Figure 14:
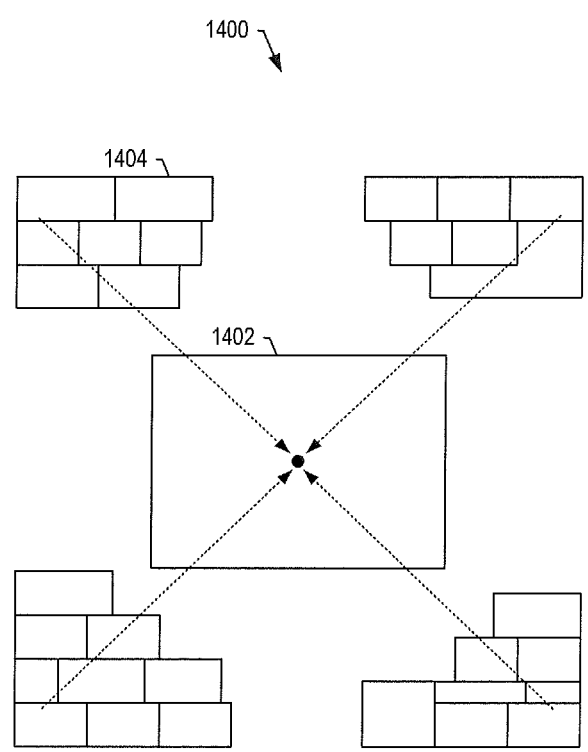

FIG. 14 illustrates a load-shape layout model 1400 according to one example embodiment. This layout model may be similar to some of the other layout models (e.g., center-out, center-out triangulated) including a dominating, centrally-located primary page 1402, and pages 1404 related to the primary page (e.g., hierarchically-related) located around, above and/or below the primary page. The pages in this layout model may not be consistent in size or aspect ratio. The load-shape layout model may be characterized by the timing of loading the layout (or more particularly its visual presentation). In this layout model, the non-primary pages may be loaded first, followed by the primary page.

An example of the load-shape layout model 1400 may be pages of media content related in time where pages of older media content may be loaded before the primary page of the most-current media content. The timing of media content in this context may relate to a time-aspect of the subject(s) or object(s) of the media content. For example, pages (e.g., pages 1404) for the preceding history of a court decision may be loaded before the court decision (e.g., page 1402) itself. In another example, the timing of media content may relate to the time of creation of the content, such as in the case of loading a first draft and one or more changes or revisions to a document (e.g., pages 1404) before the final or current version of the document (e.g., page 1402).

Figure 15:
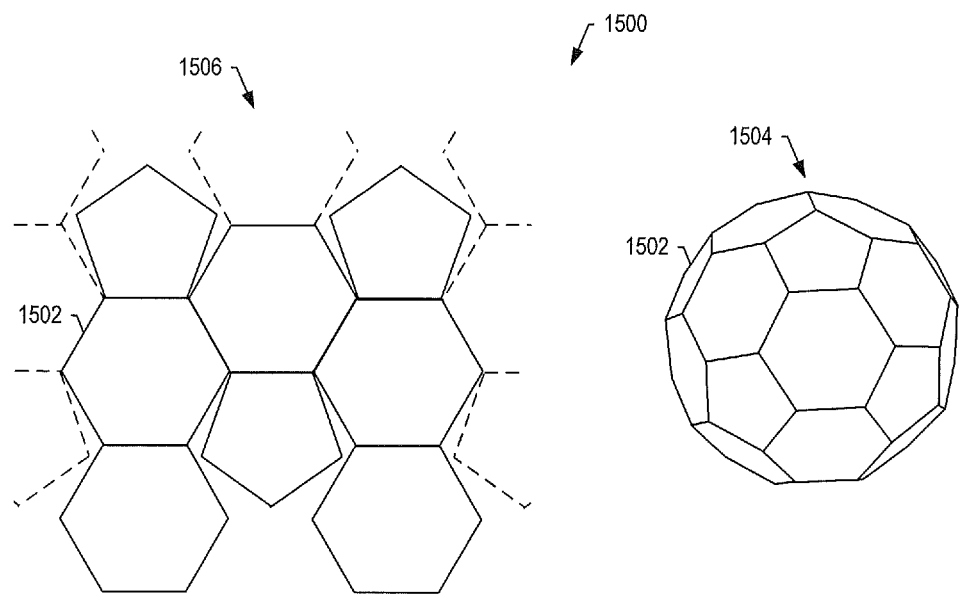

FIG. 15 illustrates a facet layout model 1500 according to one example embodiment. The facet layout model may be characterized by the arrangement of pages 1502 in a three-dimensional (3D) environment, such as in the context of facets of a 3D structure such as a truncated icosahedron 1504. For example, each page may be created from a set of x, y, z coordinates with a known consistent unit vector for orientation. Each page may then be placed in the layout in relation to a viewer's perspective. This layout model may be visually presented in three dimensions, or may be translated to a corresponding two-dimensional (2D) arrangement, such as a translated truncated icosahedron 1506.

Figure 16:
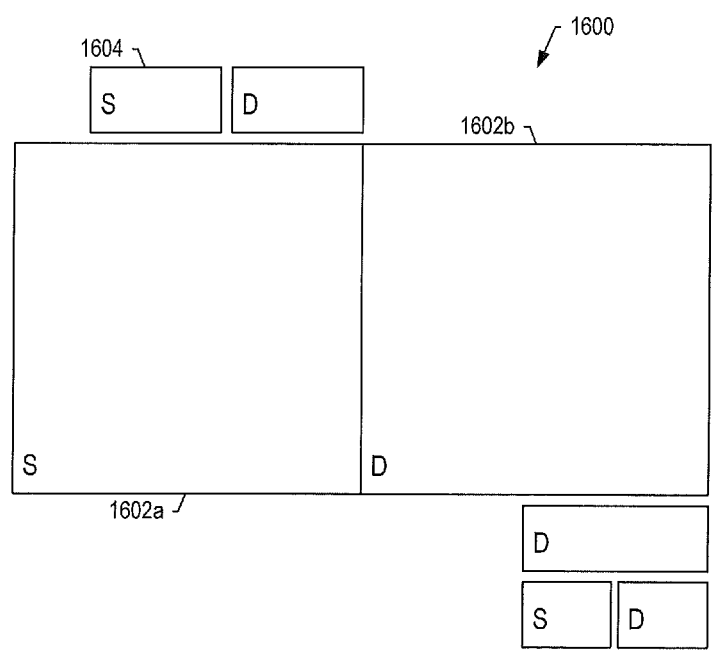

FIG. 16 illustrates a mixed-media/static-and-dynamic layout model 1600 according to one example embodiment. This layout model may be a subset of one or more other layout models in which the pages of a layout may include pages of mixed media types. For example, this layout model may include one or more static ("S") pages such as in the case of textual content or still images, and one or more dynamic ("D") pages such as in the case of video. FIG. 16 illustrates for example the mixed-media/static-and-dynamic layout model arranging mixed-media content in an arrangement similar to the size-dominance layout model 1100. As shown, this arrangement may include dominating, centrally-located primary pages 1602a, 1602b, and pages 1604 related to the primary pages (e.g., hierarchically-related) located around the primary pages.

Now turning back to FIG. 4, a document navigation system 400 is shown according to one example embodiment. As indicated above, the document navigation system 400 may be one example of the document navigation system 106 of the panoptic visualization system 100 of FIG. 1. The document navigation system may be generally configured to select and provide navigation option(s) for navigating a layout of panoptically-arranged, logically-related pages of a panoptic visualization document collection. In one example, this may include the collection from the document collection system 102 (e.g., document collection system 200). Additionally or alternatively, for example, it may include the layout generated by the document layout system 104 (e.g., document layout system 300).

As shown in FIG. 4, the document navigation system 400 may include a navigation engine 402 configured to receive a layout of pages (document components) of a panoptic visualization document collection. The collection may have a plurality of pages each of which includes respective media content and have associated metadata providing information about the respective page. The layout may include a panoptic arrangement of visual representations of the pages of the layout according to the associated metadata of the respective pages.

The navigation engine 402 may also be configured to select one or more navigation options from a plurality of navigation options for navigating the layout, in which the navigation options may be selected according to the associated metadata for the pages of the layout. The navigation options may be maintained in a respective storage such as file storage, database storage, cloud storage or the like, and formatted and stored in any of a number of different manners according to the respective storage. Similarly, the metadata for the pages of the layout may be stored in a respective storage 404, which in one example may correspond to either or both of storage 208, 306. The navigation engine may also be configured to communicate the selected navigation options, such as to a GUI in which the selected navigation options may be presented along with the layout.

In one example, the navigation engine 402 may be configured to select navigation options according to the type(s) of document(s) of which the pages of the layout are constituents, which may be indicated in the associated metadata for the pages. In one example, the navigation engine may be configured to select navigation options according to the media content of the pages of the layout, such as their subject(s) and/or object(s), which may also be indicated in the associated metadata. Examples of suitable navigation options for a layout include command tools (e.g., pan, rotate, zoom, obscure/show, home, etc.), annotation tools (e.g., timeline/milestone, callout, etc.), linking tools (hyperlink, hotlink, hotspot, etc.), navigation path tools (e.g., tracking, recording, etc.), metadata tools (e.g., search, filter, insertion, etc.), page tools (e.g., search, filter, cue, activation, size, location, dominance, logical relationship(s), etc.), layout-model change, co-navigation, hyper-hypo navigation, printing or the like.

The associated metadata for the pages of the layout may directly or indirectly affect the selected navigation options. In one example, the associated metadata may be retrieved to directly affect the navigation options selected by the navigation engine 402. Additionally or alternatively, for example, the associated metadata for the pages may affect their layout, such as by affecting a selected layout model according to which the layout may be generated. More particularly, for example, the layout of pages may be generated according to a layout model selected according to the type of document(s) of the pages, and/or media content of the pages. The layout may then affect the navigation options selected by the navigation engine. In either event of the associated metadata directly or indirectly affecting the selected navigation options, the navigation engine may be said to select navigation options according to the associated metadata for pages of the layout.

The document navigation system 400 may also include a request interface 404 coupled to the navigation engine 402 and configured to receive a request according to one or more of the selected navigation options. The request interface may be configured to communicate the request to the navigation engine. The navigation engine may in turn be further configured to effect an adjustment of the visual representation of the layout in response to the request and according to the request, and communicate the adjustment such as to the aforementioned GUI. In one example, the navigation engine may be configured to effect the adjustment of the visual representation without adjustment of the layout itself. In another example, the navigation engine may be configured to effect the adjustment of the visual representation including adjustment of the layout.

As suggested above, the selected navigation options may be affected by a layout and/or its pages, or in one more particular example, the associated metadata for the pages of a layout. In various instances, then, layouts of different pages may result in the selection of one or more different navigation options. For example, consider that the navigation engine 402 may at different times receive a layout of first pages and a separate layout of second pages, with each layout including a panoptic arrangement of respective pages.

In this example, the navigation engine may select first navigation options for the first layout, and second navigation options for the second layout. The first and second pages may include one or more common pages, but in one example, may also include one or more different pages. In this example, the first and second layouts may be different at least in that the first and second pages include one or more different pages. And in turn, the first and second navigation options selected by the navigation engine may include one or more different navigation options—although similar to the first and second pages, the first and second navigation options may include one or more common navigation options.

The navigation engine 402 may be configured to select any of a number of different navigation options for a layout of pages. Many layouts generated according to many different layout models, and including pages of many different types of documents, may include command tools such as pan, rotate, zoom, obscure/show, home or the like. In various instances, a portion but not all of a layout may be viewable in a GUI in which the layout is displayed. This may be the case, for example, in instances in which the size of the layout is greater than the viewable area of the GUI (sometimes referred to as a "view"), or in instances in which the layout is of pages in a 3D environment (e.g., facet layout model). In these instances, the navigation options may include panning and/or rotating to move the layout. This may include one or more pages of the layout coming into view, and may additionally or alternatively include one or more pages going out of view. Pages of the layout in view or coming into view may be retrieved and displayed, while pages out of view or going out of view may be removed from display. Further, in instances in which only a portion of a page is in view or comes into view, and in which pages are divided into tiles, only those tiles covering the viewable portion of the page may be retrieved and displayed.

The command tools may also include zooming into or out of a layout and thus its pages, which may include increasing or decreasing the size of the layout. This increasing or decreasing the size of the layout may in turn include increasing or decreasing the size(s) and, in various instances of one example, the resolution(s) of its pages.

In one example, pages of a layout may include sub-images at respective resolutions for zoom levels of the pages. In this example, the layout may include for each respective page, the sub-image of the page at the resolution that matches or most closely matches the page's size specified by a selected layout model and/or associated metadata. A zoom-in of the layout, then, may be effectuated by replacing the sub-images of its pages with respective sub-images at increased zoom levels, and hence increased resolutions. Conversely, a zoom-out of the layout may be effectuated by replacing the sub-images of its pages with respective sub-images at decreased zoom levels, and hence decreased resolutions.

In various examples, the zoom (in or out) of a page or layout may be capable at a finer increment than provided by zoom levels of the page or one or more pages of the layout. The zoom of a page (alone or as part of a layout) may be to an increment that relative to a sub-image of the page being displayed, another sub-image of the page matches or most closely matches the page's increased/decreased size. In these instances, for example, the zoom may be effectuated by replacing a sub-image of the page with a corresponding sub-image of the page at a higher/lower resolution. In other instances, however, the zoom may be to an increment that relative to a sub-image of the page being displayed, the same sub-image still most closely matches the page's increased/ decreased size. In these instances, for example, the zoom may be effectuated by increasing the size of the sub-image of the page without replacing the sub-image with another at a higher/lower resolution.

In a further example, a page may not only include respective sub-images, but the sub-images across zoom levels may be divided into progressively larger numbers of tiles each of which covers a spatial area of the sub-image at a respective zoom level. In this example, a zoom-in of the layout may be effectuated by replacing the displayed tile(s) of its pages with the increased numbers of tiles covering the pages at higher zoom level(s). Conversely, a zoom-out of the layout may be effectuated by replacing the displayed tiles with the decreased numbers of tile(s) covering the pages at lower zoom level(s). Similar to panning a layout, zooming into or out of a layout may include one or more pages of the layout coming into view, and may additionally or alternatively include one or more pages going out of view. These pages may be handled in a manner similar to panning the layout, but at higher or lower zoom level(s).

In addition to increase or decrease in size/resolution of pages of a layout, for one or more layouts, the zoom option may implicate one or more other navigation options to further affect one or more of the pages. For example, the overlap-through-detail layout model 1200 and master-detail through depth layout model 1300 may implicate obscure/show options in which overlaying pages may be obscured or shown relative to overlaid pages during zoom-in and zoom-out, such as in the manner explained above with reference to FIGS. 12 and 13. It should be understood, however, that the obscure/show options may be utilized to obscure or show one or more pages of a layout independent of the zoom option, and independent of pages overlaying one another.

A number of navigation options including those command tools described above may effect an adjustment of the visual presentation of a layout. A home option may therefore permit a user to return to the visual presentation from the adjusted visual presentation.

The navigation options may include annotation tools such as timeline/milestone, callout or the like. These tools may permit a user to add annotations to a layout, and may be selected for a number of different layouts to different layout models, and including pages of many different types of documents. The timeline/milestone option in various examples may be more particularly applicable to pages logically related to one another in a time sequence. In one example, timeline/milestone may effect a visualization added to the layout that may relate pages of the layout as milestones in a timeline.

The navigation options may include linking tools such as hyperlink, hotlink, hotspot or the like. In accordance with the hyperlink option, one or more pages (each a source) may include reference(s) or link(s) to other page(s) or media content of other page(s) (the page(s) or media content being a target). The target page(s) or media content may be in the same layout, or in the same panoptic visualization document collection but perhaps not in the same layout. The target may even include page(s) or media content not in the same panoptic visualization document collection.

The hyperlink option may permit a source page to include inline in its media content, content linked from one or more other pages. This is sometimes more particularly referred to as a hot link. The hyperlink option may also permit a user to navigate from a source page to one or more target pages linked to the respective source page. In this regard, a hyperlink may be represented in any of a number of different manners, such as by text, graphic or the like. For example, media content of one page may be formatted as a hyperlink to another page or media content of another page. More particularly, for example, an object depicted in one page may be formatted as a hyperlink to another page that also depicts the object, or more directly to the object depicted in the other page. This type of hyperlink is sometimes referred to as a hotspot.

In addition to or in lieu of the foregoing, for example, the navigation options may include navigation path tools such as tracking, recording or the like. A navigation path according to example embodiments may be defined in any of a number of different manners. In one example, a navigation path may be defined by a sequence of a user panning, rotating, zooming and/or repositioning a layout or one or more of its pages, navigating from one page to another page or media content (hyperlink), or otherwise effecting an adjustment of the layout (or rather its visual presentation). The navigation path tools may permit tracking and/or recording a navigation path followed by a user, thereby creating a navigation history.

The navigation options of one example may include metadata tools such as search, filter, insertion or the like, which may operate with respect to the associated metadata for pages of the layout. The search and filter options may permit a user to search the associated layout for particular metadata, or filter the associated metadata to include or exclude particular metadata. The insertion option may permit the insertion of particular metadata to the visual presentation of the layout, such as in the form of a callout including the particular metadata referenced to page(s) for which the associated metadata includes the particular metadata.

The navigation options may include page tools such as search, filter, cue, activation, size, location, dominance, logical relationship(s) or the like. Similar to the metadata tools, the search and filter options may permit a user to search the pages of the layout for particular page(s) or particular media content. In this regard, the search and filter options may implicate the associated metadata for pages of the layout.

The cue option may permit the application of one or more visual effects to one or more pages to draw the user's attention to those page(s) in the layout. The visual effect may be any of a number of different effects. Examples of suitable visual effects include an opaque or translucent border of a noticeable color (e.g., yellow) around the page(s), an opaque or translucent visual object or shape smaller than and overlaying the page(s) or a translucent visual object or shape the same or greater in size than and overlaying the page(s), or the like. Examples of other suitable visual effects include an increase in a size of the page(s), an animation applied to the page(s), or the like.

The visual effect(s) may be triggered in any of a number of different manners, as may the page(s) to which the effect(s) are applied. For example, visual effect(s) may be triggered to indicate selection of one or more page(s). In this example, the visual effect(s) may be applied to the selected page(s). Additionally or alternatively in this example, visual effect(s) may be applied to page(s) having a particular logical relationship with the selected page(s) (e.g., share common document, subject and/or object, adjacency, object-subject subject-object, parent-child, reference/link, user specified, etc.). In another example, visual effect(s) may be applied to page(s) to indicate a navigation path followed by the user.

The activation option may be more particularly applicable to dynamic pages and may permit a user to trigger activity of one or more pages, such as by playing or otherwise controlling (e.g., rewind, fast forward, volume, mute, etc.) video content that may be included in such page(s).

Size, location and dominance options may permit a user to resize or otherwise rearrange one or more page(s) of a layout, which may in effect create a different layout. These options may be applicable to a number of different layouts to different layout models, and including pages of many different types of documents. In one example, however, the dominance option may be more particularly applicable to layouts according to a layout model including a dominating page, such as hierarchy, center out, center-out triangulated, size dominance, load shape, mixed-media/static-and-dynamic or the like.

The logical relationship(s) option may permit a user to add, delete or otherwise change one or more logical relationships between pages, which may in turn effect a change in the layout of pages. These changes may or may not carry from navigation of a layout of pages to the associated metadata of those pages and any other similarly related pages. Thus, in one example, the changes may be temporary in that they are only applied to the layout of pages currently being visually presented. In another example, the changes may be more permanent in that they result in corresponding changes to the associated metadata for pages, which may not only result in a change in the currently presented layout but other layouts generated including the affected pages.

Further examples of navigation options may include layout-model change, co-navigation, hyper-hypo navigation, printing or the like. The layout-model change option may permit the user to change the layout model according to which the visually presented layout has been generated. This option may result in a rearrangement of the pages of the layout according to another layout model, thereby generating another layout. The co-navigation option may permit users of different instances of the same system to collaboratively navigate a layout of pages that may have been generated by one of the systems, but may be concurrently visually presented by both systems. The hyper-hypo navigation option may permit navigation between unique layout states or other pages that may not be part of the same panoptic visualization document collection as pages of the layout (hyper navigation), and/or navigation with a single layout state that may change as a result of that navigation (hypo navigation). And the printing option may permit the user to direct the visually-presented layout to a printer for generating a printout of it.

To further illustrate example embodiments of the present disclosure, reference will now be made to FIG. 17, which depicts an operational diagram 1700 of operations that may be performed by the panoptic visualization system 100 according to one example embodiment. According to the illustrated example, the panoptic visualization system may be implemented as an application configured to receive one or more documents and generate a website including a layout of its pages and appropriate supporting elements such as for navigation of the layout.

As shown at blocks 1702 and 1704, the operations may include a user opening or otherwise causing execution of the application, and dragging and dropping a document (e.g., PDF document) into the application. The panoptic visualization system 100 or more particularly its document collection system 102 may thereby receive the document, after which the document collection system may disassemble the document into its constituent pages, as shown in block 1706.

The document collection system 102 may identify links between pages of the document and a layout model for arranging the pages, such as according to the structure of the document, as shown in block 1708. The document collection system may also extract, generate or otherwise provide metadata associated with the pages, as shown in block 1710. And the document collection system may process, or communicate with the document navigation system 106 to process, the metadata associated with the pages to generate metadata for one or more supporting website elements, as shown in block 1712. These supporting website elements may include, for example, one or more navigation options or the like. The document collection system may then collect the metadata associated with the pages, and metadata for the supporting website elements, as website metadata.

As shown in block 1714, the document collection system 102 may further save each page of the disassembled document with a unique name, and in one example, as an image (e.g., JPEG, PNG). The document collection system may also tile and/or compress the pages for easier storage and retrieval, as shown in block 1716.

The document collection system may communicate the tiled (and possibly compressed) pages and website metadata to the document layout system 104, which may select the appropriate layout model and generate a layout of the pages for a website, as shown in block 1718. The document collection system may also communicate the website metadata to the document navigation system 106, and in one example, the document layout system may communicate the layout to the document navigation system. In response, the document navigation system may select one or more navigation options for navigating the layout, as shown in block 1720. The panoptic visualization system 100 may then be configured to generate a website including the layout and navigation option(s), as shown in block 1722.

Figure 18:
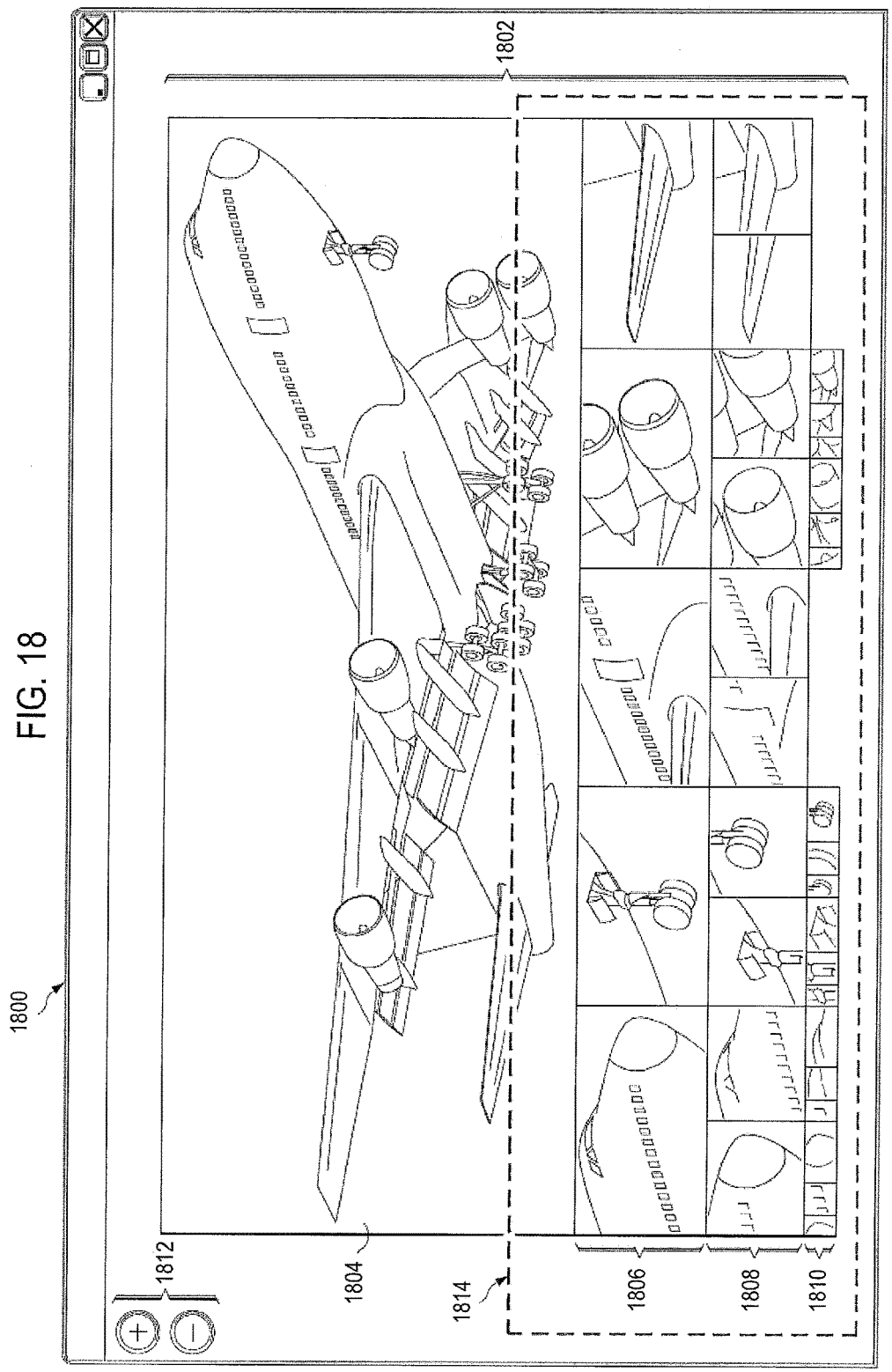
Figure 19:
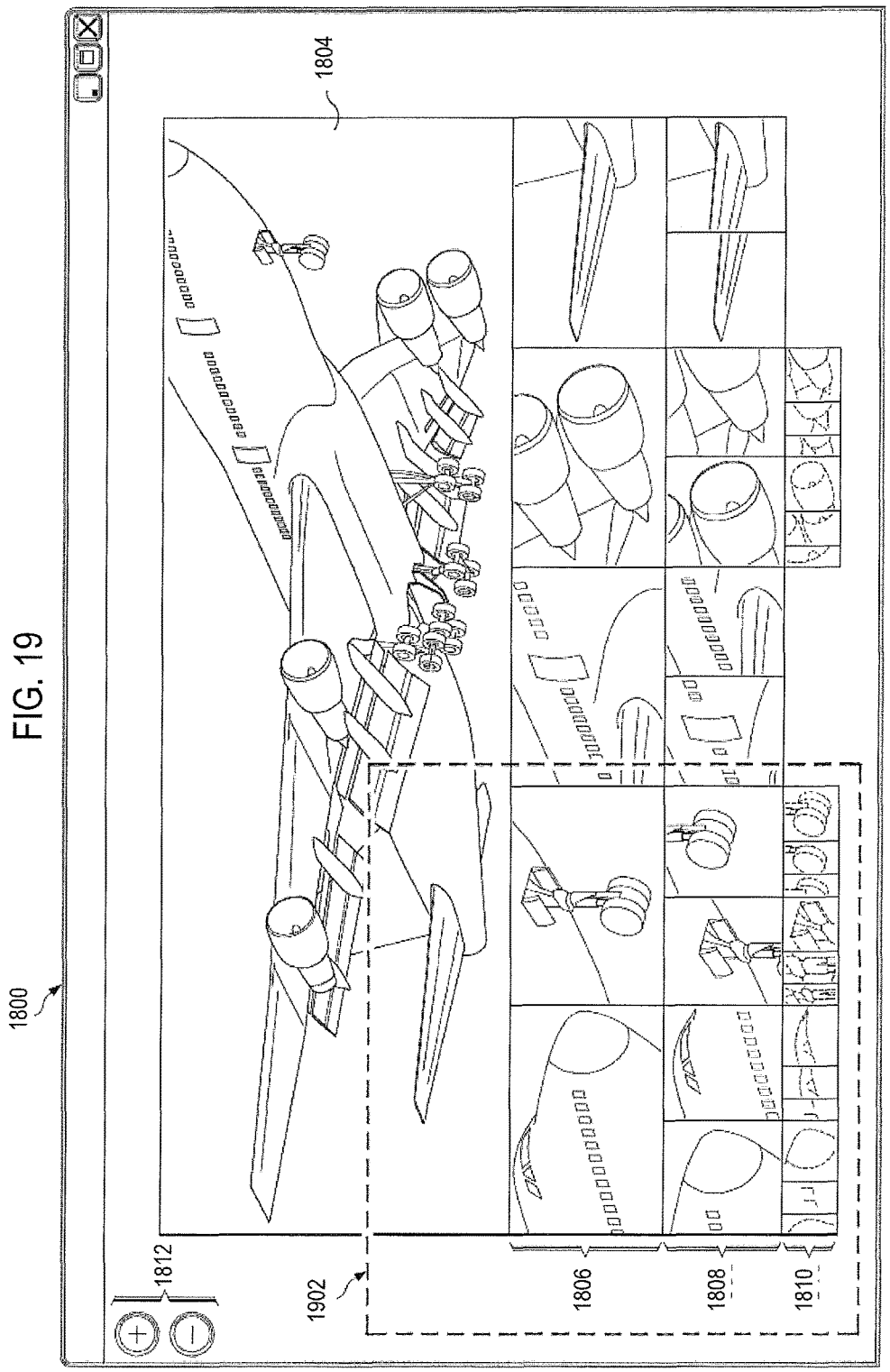
Figure 20:
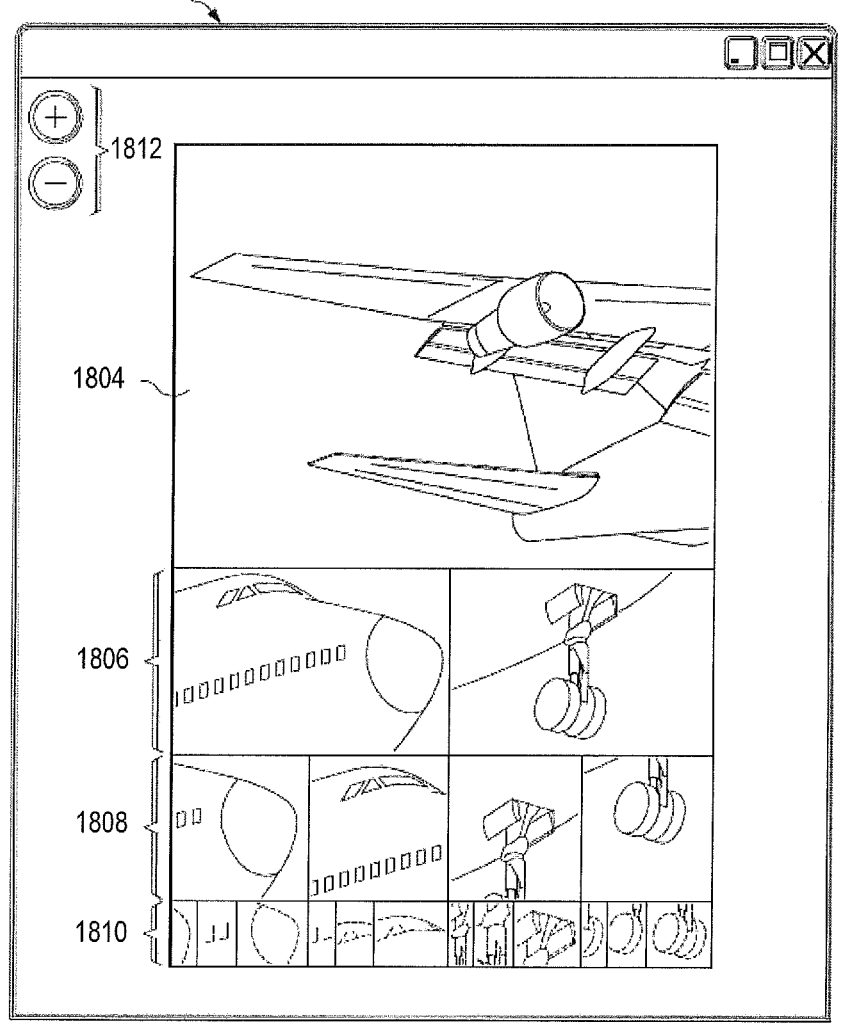

To even further illustrate example embodiments of the present disclosure, reference will now be made to FIGS. 18-23, which depict example layouts of pages that may be displayed in a GUI that has a predetermined viewable area, and which may be navigated by a user, according to an example embodiment of the present disclosure. FIGS. 18-20 illustrate an example of a layout according to the hierarchy layout model 600 displayed in a GUI that has a predetermined viewable area 1800. As shown, a layout according to the hierarchy layout model may include a plurality of pages 1802, each of which in one example may be a sub-image of the page at a respective resolution. Various ones of the pages may have different resolutions in the layout, with page 1804 having a higher resolution than pages 1806, which in turn have a higher resolution than pages 1808, which again in turn have a higher resolution than pages 1810.

The pages may be located and/or sized in the layout according to logical relationship(s) between the pages. In the example shown, the pages 1802 are engineering drawings of an aircraft, and may have object-subject relationships. More particularly, for example, object(s) of a page on a level of the hierarchy may be subject(s) of pages below it in the hierarchy, the subject(s) in one example being additional detail regarding the object(s).

More particularly, for example, page 1804 may depict an exterior view of the entire aircraft. Pages 1806 may depict a nose section, a landing gear assembly, a window, an engine assembly and a tail assembly. Pages 1808 may depict additional detail about the content of respective ones of pages 1806, and pages 1810 may depict additional detail about the content of respective ones of pages 1808. In the viewable area 1800, however, pages 1808, 1810 may be presented at a resolution that causes their media content to be only partially understood or not understood at all by a user. Of course, in other example embodiments, pages 1808 and/or pages 1810 may be presented at a sufficient resolution to interpret substantially all of their media content.

The GUI may present one or more selected navigation options for navigating the layout of pages 1802. In this illustrative example, pan and zoom navigation options may be presented in the form of controls 1812 to move and/or increase the size of the pages in the viewable area 1800 to focus on a portion 1814 of the layout. In other words, the user may activate the aforementioned controls to move and/or zoom the layout to fill a greater portion of the viewable area of the GUI with a portion of the layout. FIG. 19 illustrates one example of the result of navigating the layout in this manner.

As shown in FIG. 19, as the user activates controls 1812 to focus on the portion 1814 of the layout, the size of pages 1804-1810 may increase which, in one example, may include replacing sub-images of pages 1804-1808 with corresponding sub-images at higher resolutions. The resolution of the sub-images may allow the user to interpret substantially all of the presented media content. In this view, however, pages 1810 may not be presented with sufficient resolution to be interpreted by the user, because the size of the respective pages may not have been increased to a level implicating a next sub-image. That is, even after having increased the size of the image, the size may still most closely approximate the same sub-image so as to not cause its replacement with the next sub-image at a higher resolution. In this illustrative example, the user may again activate controls 1812 to move and/or resize the view to focus on an even smaller portion 1902 of the layout.

One example of the result of navigating the layout to focus on portion 1902 is shown in FIG. 20. In one example, the viewable area 2000 of the GUI may resize to more fully accommodate the focused portion of the layout. As the user activates the controls 1812 to focus on the portion 1902 of the layout, the size of pages 1804-1810 may increase, which in one example, may now further include replacing a sub-image of page 1810 with a corresponding sub-image at a higher resolution. The media content of page 1810 may now be sufficient to be interpreted by the user. In one example in which only a portion of page 1804 is within the viewable area of the GUI, and in which the respective page is divided into tiles, only those tiles covering the viewable portion of the respective page may be retrieved and displayed.

Figure 21:
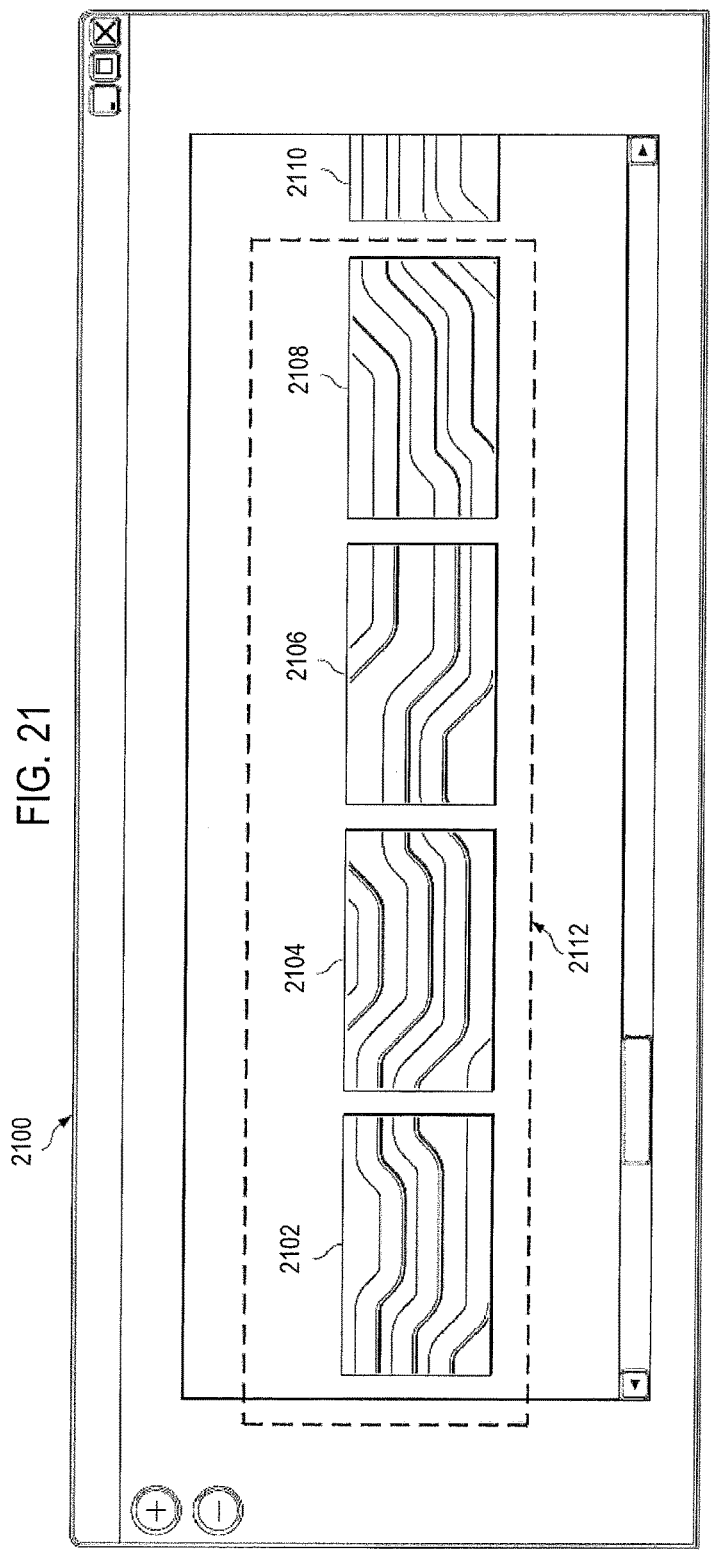

FIG. 21 illustrates an example of a layout according to the brickwall layout model 500 displayed in a GUI that has a predetermined viewable area 2100. The layout may include pages 2102-2110. In the example shown, the pages of the layout are wiring diagrams of a wiring system, which may be related by a spatial sequence. In this regard, page 2102 may depict wire(s) that connect to wire(s) depicted in page 2104. Page 2104 may in turn depict wire(s) that connect to wire(s) depicted in page 2106, and so forth for wire(s) of page 2106 to those of page 2108, and wire(s) of page 2108 to those of page 2110.

Pages of the layout entirely within the viewable area 2100 of the GUI may form or otherwise define an area or region of interest 2112. In one example, pages within the region of interest may be presented with an increased resolution relative to any pages outside the region of interest. As shown, the region of interest may include pages 2102-2108, but because only a portion of page 2110 is within the viewable area of the GUI, page 2110 may be considered outside the region of interest (although it may still be considered within the viewable area). In this instance, page 2110 may be presented at a lower resolution than the resolution(s) of pages 2102-2108.

Figure 22:
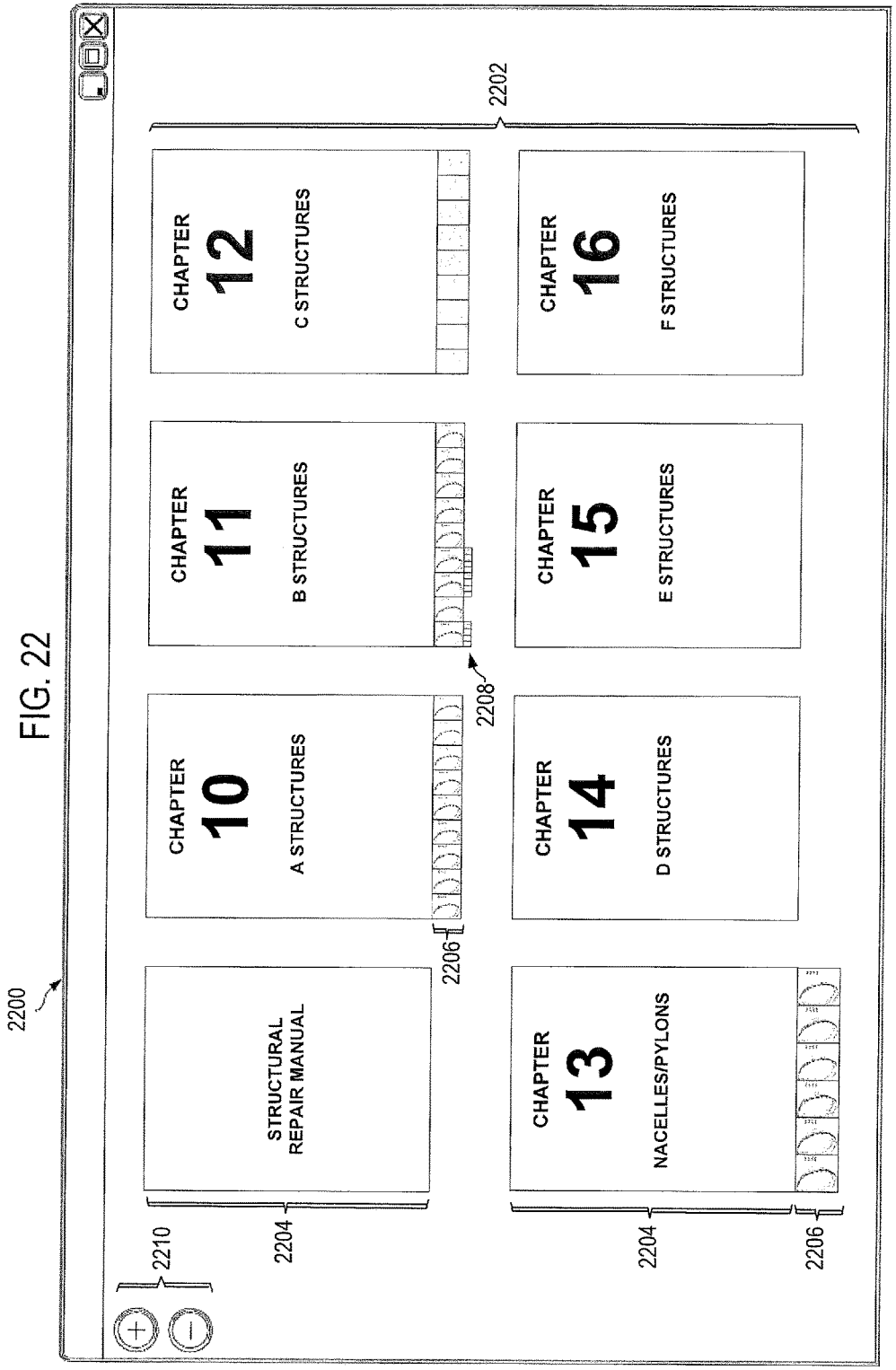

More particularly in the context of a structural repair manual (SRM), FIG. 22 illustrates another example of a portion of a layout according to a combination of the brickwall and hierarchy layout models 500, 600 displayed in a GUI that has a predetermined viewable area 2200. As shown, a layout according to the hierarchy layout model may include a plurality of pages 2202, each of which in one example may be a sub-image of the page at a respective resolution. Similar to before, various ones of the pages may have different resolutions in the layout, with page 2204 having a higher resolution than pages 2206, which in turn have a higher resolution than pages 2208. Also similar to before, the GUI may present one or more selected navigation options for navigating the layout of pages, such as controls 2210 to move and/or increase the size of the pages in the viewable area to focus on a portion of the layout.

Again, the pages 2202 may be located and/or sized in the layout according to logical relationship(s) between the pages. In the illustrated example, the pages are from an SRM and may be logically related according to the structure of the document. Pages 2204 may reflect title and chapter pages of the document, and may be arranged in a brickwall layout model 500. Underneath pages 2204, pages 2206 and 2208 may reflect pages of respective chapters, or sections or subsections of respective chapters, and may be arranged in a hierarchical layout model 600. In one example, pages 2206 may reflect pages of sections of respective chapters, and pages 2208 may reflect pages of respective sections.

Figure 23:
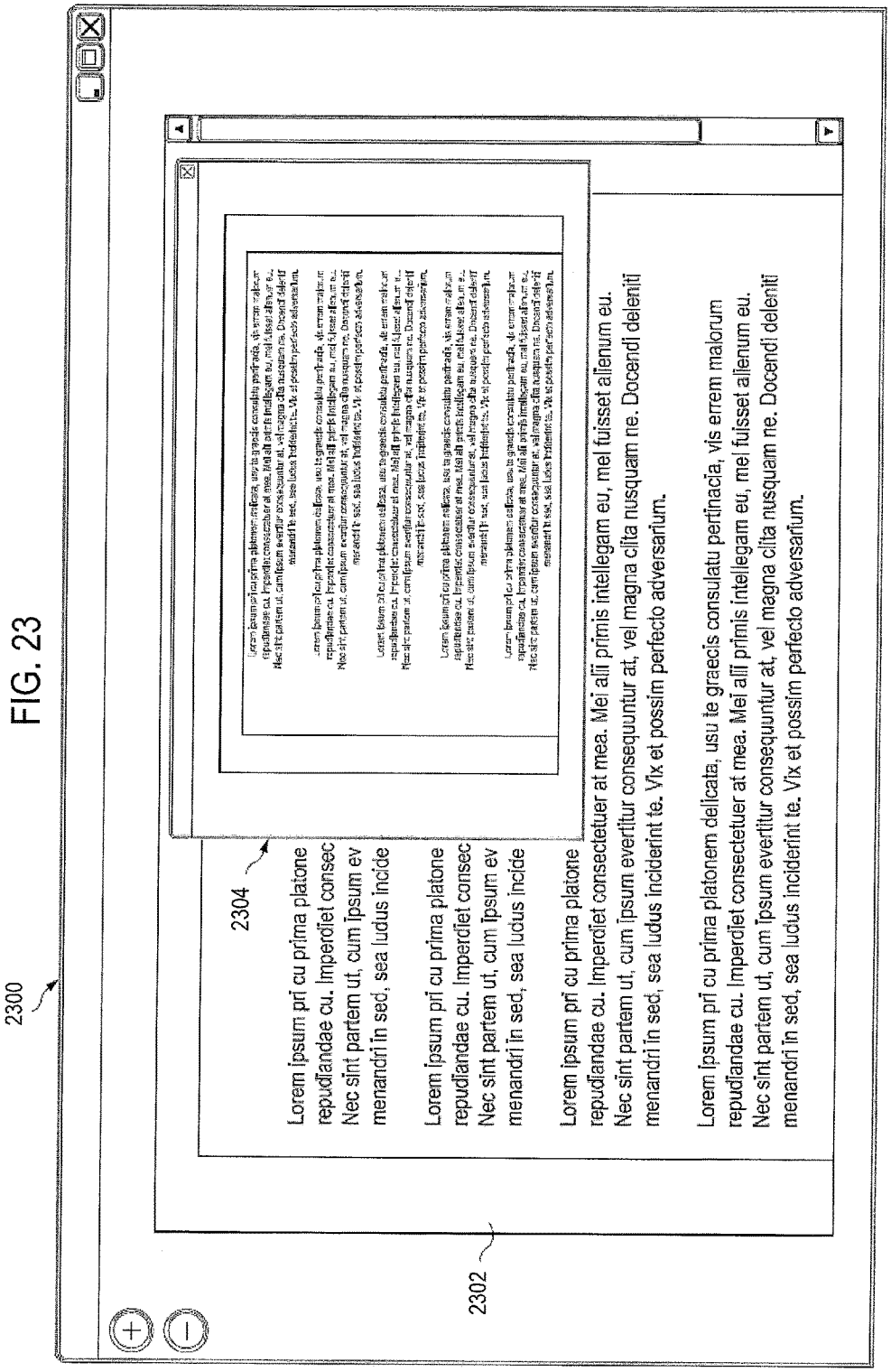

FIG. 23 illustrates an example of a layout according to the overlap-through-detail layout model 1200 displayed in a GUI that has a predetermined viewable area 2300. As shown, the layout includes pages 2302, 2304, and in which page 2302 may include a reference to page 2304. As shown, this hierarchical relationship may be maintained by the layout in which page 2304 (higher in the hierarchy) may partially overlay page 2302, and in one example, page 2304 may overlay page 2302 at the location of its reference in the respective page. As also shown, page 2304 may be presented smaller in size than page 2302, and may therefore be presented with a lower resolution than page 2302.

According to example embodiments of the present disclosure, the panoptic visualization system 100 and its subsystems including the document collection system 102, document layout system 104 and document navigation system 106 may be implemented by various means. Similarly, the examples of a document collection system 200, document layout system 300 and document navigation system 400, including each of their respective elements, may be implemented by various means according to example embodiments. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary embodiments of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

As explained above, example embodiments of the present disclosure permit the collection, layout and/or navigation of a large number of pages (or documents). Example embodiments may allow a user to simultaneously and quickly view and visually search a large number of pages while using less bandwidth than retrieving all of the pages. In instances in which a user may generally have an idea of the appearance of page(s) of interest, or have an idea of a logical relationship between the respective page(s) and other pages, a layout of pages may be generated and/or navigated to allow the user to locate and use page(s) of interest. The user may view and navigate pages as though they were laid out in the physical world without the physical space requirement involved with large collections of pages.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims Although specific terms are employed herein, they are used in a generic and descriptive sense only and not for purposes of limitation.

What is claimed is:

1. An apparatus for implementation of a system for panoptic visualization of a document, the apparatus comprising a processor and a memory storing executable instructions that in response to execution by the processor cause the apparatus to implement at least:
    a document parser configured to receive and disassemble an electronic document into a plurality of constituent pages that are groupings of media content of the electronic document between basic breaking points, each page including respective media content, the document having a hierarchical structure defined according to a particular schema;
    a colligater coupled to the document parser and configured to colligate the pages, including being configured to provide associated metadata for each page of the plurality, the associated metadata for each page being according to some metadata schema and providing structured information identifying a link between the page and one or more other pages of the plurality, the link establishing a hierarchical relationship between the respective pages according to the hierarchical structure of the document; and
    a layout engine configured to generate a layout of pages of the document, the layout including a panoptic arrangement of images of the pages of the layout according to the associated metadata of the respective pages, the associated metadata for at least one page of the layout including information identifying one or more links between the respective page and one or more other pages of the layout, the panoptic arrangement being two-dimensional and the hierarchical relationship between the respective pages being expressed in the panoptic arrangement by a difference in size of at least some of the images relative to others of the images, the image of each page of the layout including an image of the respective media content of the page, and
    wherein the layout engine is configured to communicate the layout.

2. The apparatus of claim 1, wherein the hierarchical structure of the document is reflected in the media content of the one or more pages of the document, or encoded in the document.

3. The apparatus of claim 1, wherein the memory stores further executable instructions that in response to execution by the processor cause the apparatus to implement:
    a search engine coupled to the layout engine and configured to receive a request for media content and identify a page including the requested media content, the identified page being of the document,
    wherein the layout engine is configured to retrieve pages of the document including the identified page and one or more other pages identified according to the associated metadata for the identified page, the respective associated metadata including information identifying one or more links between the identified page and respective one or more other pages, and
    wherein the layout engine being configured to generate the layout of pages includes being configured to generate a layout of the retrieved pages.

4. The apparatus of claim 1, wherein the memory stores further executable instructions that in response to execution by the processor cause the apparatus to implement:
    a navigation engine coupled to the layout engine and configured to select one or more navigation options from a plurality of navigation options for navigating a visual presentation of the layout, the navigation options being selected according to the associated metadata for the pages of the layout,
    wherein the navigation engine is configured to communicate the selected navigation options.

5. The apparatus of claim 1, wherein the associated metadata for each page also includes information specifying one or more of a size, location or depth of the image of the respective page in the layout, and
    wherein for each of the pages of the layout, the layout engine is configured to generate the layout according to the one or more of the size, location or depth specified by the information provided in the associated metadata.

6. The apparatus of claim 5, wherein for each of one or more of the pages of the layout, the page is in a state including images at respective resolutions of the page, and the associated metadata provides information specifying at least the size of the image of the respective page in the layout, and
    wherein for each of one or more of the pages of the layout, the layout engine being configured to generate the layout includes being configured to retrieve the page for the image at a resolution that matches the size specified by the information provided in the associated metadata.

7. The apparatus of claim 6, wherein for each of one or more of the pages of the layout, the associated metadata provides information specifying at least the size of the image of the respective page in the layout, the size being specified relative to one or more others of the retrieved pages.

8. The apparatus of claim 1, wherein the images of the pages of the layout include images of pages at a higher level and images of pages at a lower level in the hierarchical structure, and
    wherein the layout engine is configured to generate the layout in which the images of pages at the higher level are at the same depth as and above the images of pages at the lower level, and larger in size relative to the images of pages at the lower level.

9. The apparatus of claim 8, wherein the layout engine is configured to generate the layout in which the images of pages at the lower level have an aspect ratio that constrains the images collectively to a width of the images of pages at the higher level.

10. A method comprising:
receiving and disassembling an electronic document into a plurality of constituent pages that are groupings of media content of the electronic document between basic breaking points, each page including respective media content, the document having a hierarchical structure defined according to a particular schema;
colligating the pages, including providing associated metadata for each page of the plurality, the associated metadata for each page being according to some metadata schema and providing structured information identifying a link between the page and one or more other pages of the plurality, the link establishing a hierarchical relationship between the respective pages according to the hierarchical structure of the document;
generating a layout of pages of the document, the layout including a panoptic arrangement of images of the pages of the layout according to the associated metadata of the respective pages, the associated metadata for at least one page of the layout including information identifying one or more links between the respective page and one or more other pages of the layout, the panoptic arrangement being two-dimensional and the hierarchical relationship between the respective pages being expressed in the panoptic arrangement by a difference in size of at least some of the images relative to others of the images, the image of each page of the layout including an image of the respective media content of the page; and
communicating the layout.

11. The method of claim 10, wherein the hierarchical structure of the document is reflected in the media content of the one or more pages of the document, or encoded in the document.

12. The method of claim 10 further comprising:
receiving a request for media content and identify a page including the requested media content, the identified page being of the document; and
retrieving pages of the document including the identified page and one or more other pages identified according to the associated metadata for the identified page, the respective associated metadata including information identifying one or more links between the identified page and respective one or more other pages,
wherein generating the layout of pages includes generating a layout of the retrieved pages.

13. The method of claim 10 further comprising:
selecting one or more navigation options from a plurality of navigation options for navigating a visual presentation of the layout, the navigation options being selected according to the associated metadata for the pages of the layout; and
communicating the selected navigation options.

14. The method of claim 10, wherein the associated metadata for each page also includes information specifying one or more of a size, location or depth of the image of the respective page in the layout, and
wherein for each of the pages of the layout, the layout is generated according to the one or more of the size, location or depth specified by the information provided in the associated metadata.

15. The method of claim 14, wherein for each of one or more of the pages of the layout, the page is in a state including images at respective resolutions of the page, and the associated metadata provides information specifying at least the size of the image of the respective page in the layout, and
wherein for each of one or more of the pages of the layout, generating the layout includes retrieving the page for the image at a resolution that matches the size specified by the information provided in the associated metadata.

16. The method of claim 15, wherein for each of one or more of the pages of the layout, the associated metadata provides information specifying at least the size of the image of the respective page in the layout, the size being specified relative to one or more others of the retrieved pages.

17. The method of claim 8, wherein the images of the pages of the layout include images of pages at a higher level and images of pages at a lower level in the hierarchical structure, and
wherein generating the layout includes generating the layout in which the images of pages at the higher level are at the same depth as and above the images of pages at the lower level, and larger in size relative to the images of pages at the lower level.

18. The method of claim 17, wherein generating the layout includes generating the layout in which the images of pages at the lower level have an aspect ratio that constrains the images collectively to a width of the images of pages at the higher level.

19. A computer-readable storage medium that is non-transitory and has computer-readable program code portions stored therein that, in response to execution by a processor, cause an apparatus to at least:
receive and disassemble an electronic document into a plurality of constituent pages that are groupings of media content of the electronic document between basic breaking points, each page including respective media content, the document having a hierarchical structure defined according to a particular schema;
colligate the pages, including being caused to provide associated metadata for each page of the plurality, the associated metadata for each page being according to some metadata schema and providing structured information identifying a link between the page and one or more other pages of the plurality, the link establishing a hierarchical relationship between the respective pages according to the hierarchical structure of the document;
generate a layout of pages of the document, the layout including a panoptic arrangement of images of the pages of the layout according to the associated metadata of the respective pages, the associated metadata for at least one page of the layout including information identifying one or more links between the respective page and one or more other pages of the layout, the panoptic arrangement being two-dimensional and the hierarchical relationship between the respective pages being expressed in the panoptic arrangement by a difference in size of at least some of the images relative to others of the images, the image of each page of the layout including an image of the respective media content of the page; and
communicate the layout.

20. The computer-readable storage medium of claim 19, wherein the hierarchical structure of the document is reflected in the media content of the one or more pages of the document, or encoded in the document.

21. The computer-readable storage medium of claim 19, wherein the computer-readable storage medium has further computer-readable program code portions stored therein that, in response to execution by the processor, cause the apparatus to further:

receive a request for media content and identify a page including the requested media content, the identified page being of the document; and retrieve pages of the document including the identified page and one or more other pages identified according to the associated metadata for the identified page, the respective associated metadata including information identifying one or more links between the identified page and respective one or more other pages, wherein the apparatus being caused to generate the layout of pages includes being caused to generate a layout of the retrieved pages.

22. The computer-readable storage medium of claim 19, wherein the computer-readable storage medium has further computer-readable program code portions stored therein that, in response to execution by the processor, cause the apparatus to further:

select one or more navigation options from a plurality of navigation options for navigating a visual presentation of the layout, the navigation options being selected according to the associated metadata for the pages of the layout; and communicate the selected navigation options.

23. The computer-readable storage medium of claim 19, wherein the associated metadata for each page also includes information specifying one or more of a size, location or depth of the image of the respective page in the layout, and wherein for each of the pages of the layout, the apparatus is caused to generate the layout according to the one or more of the size, location or depth specified by the information provided in the associated metadata.

24. The computer-readable storage medium of claim 23, wherein for each of one or more of the pages of the layout, the page is in a state including images at respective resolutions of the page, and the associated metadata provides information specifying at least the size of the image of the respective page in the layout, and wherein for each of one or more of the pages of the layout, the apparatus being caused to generate the layout includes being caused to retrieve the page for the image at a resolution that matches the size specified by the information provided in the associated metadata.

25. The computer-readable storage medium of claim 24, wherein for each of one or more of the pages of the layout, the associated metadata provides information specifying at least the size of the image of the respective page in the layout, the size being specified relative to one or more others of the retrieved pages.

26. The computer-readable storage medium of claim 19, wherein the images of the pages of the layout include images of pages at a higher level and images of pages at a lower level in the hierarchical structure, and wherein the apparatus is caused to generate the layout in which the images of pages at the higher level are at the same depth as and above the images of pages at the lower level, and larger in size relative to the images of pages at the lower level.

27. The computer-readable storage medium of claim 26, wherein the apparatus is caused to generate the layout in which the images of pages at the lower level have an aspect ratio that constrains the images collectively to a width of the images of pages at the higher level.

* * * * *